US008078741B2

(12) United States Patent
Barnfield et al.

(10) Patent No.: US 8,078,741 B2
(45) Date of Patent: Dec. 13, 2011

(54) DATA MANAGEMENT BETWEEN MULTIPLE DATA SOURCES

(75) Inventors: Louise D. Barnfield, San Carlos, CA (US); Mary E. G. Bear, Burlingame, CA (US); Mark P. Bennett, Livermore, CA (US); Satish Kumar Sallakonda, Dublin, CA (US); Ravi Banda, Fremont, CA (US); Chaya Bijani, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 12/431,594

(22) Filed: Apr. 28, 2009

(65) Prior Publication Data
US 2010/0274912 A1 Oct. 28, 2010

(51) Int. Cl.
*G06F 15/16* (2006.01)
*G06F 7/00* (2006.01)
(52) U.S. Cl. ........ 709/229; 709/232; 709/234; 707/610; 707/809
(58) Field of Classification Search ................ 709/229; 707/610, 809
See application file for complete search history.

(56) References Cited

U.S. PATENT DOCUMENTS

| | | | | |
|---|---|---|---|---|
| 7,428,582 B2* | 9/2008 | Bean et al. | | 709/218 |
| 7,483,901 B1* | 1/2009 | Massoudi et al. | | 715/854 |
| 7,640,348 B2* | 12/2009 | Atwal et al. | | 709/229 |
| 7,873,655 B2* | 1/2011 | Chang et al. | | 707/770 |
| 2003/0061404 A1* | 3/2003 | Atwal et al. | | 709/328 |
| 2004/0148517 A1 | 7/2004 | Banks-Binici | | |
| 2005/0108297 A1 | 5/2005 | Rollin et al. | | |
| 2005/0216300 A1 | 9/2005 | Appelman et al. | | |
| 2005/0216550 A1 | 9/2005 | Paseman et al. | | |
| 2010/0180029 A1* | 7/2010 | Fourman | | 709/225 |

FOREIGN PATENT DOCUMENTS

WO  WO2006052444 A2  5/2006

OTHER PUBLICATIONS

Corvida, 'Keep Your Profiles in Sync with Atomkeep' [online], Aug. 3, 2008 [retrieved on Oct. 2, 2008]. Retrieved from the Internet< URL: http://www.readwriteweb.com/archives/keep_your_profiles_in_sync_wit.php>.

(Continued)

*Primary Examiner* — Minh-Chau Nguyen
(74) *Attorney, Agent, or Firm* — Fliesler Meyer LLP

(57) ABSTRACT

Presented herein are systems and methods that facilitate the portability and management of user data maintained at two or more services. In embodiments, a configurable profile management interface or interfaces are provided to a user, which enable the user to identify data elements that may be maintained across one or more services. In embodiments, a user has the ability to set precedence values by identifying which elements from which service or services should be considered as sources of truth. In embodiments, those sources of truth may be used to propagate changes to one or more services. In embodiments, the profile synchronization functionality may be incorporated within a human resources (HR) system. In embodiments, the user can also configure a schedule for transferring data, can import some or all of the data, and/or can export all or some of the data.

8 Claims, 26 Drawing Sheets

OTHER PUBLICATIONS

Ernst-Jan Pfauth, 'Atomkeep merges all your profiles into one good-looking page' [online], Jul. 14, 2008 [retrieved on Oct. 2, 2008]. Retrieved from the Internet< URL: http://thenextweb.com/2008/07/14/atomkeep-merges-all-your-profiles-into-one-good-looking-page/>.

Paula Neal Mooney, 'ProfileLinker Launches and Lets Users Sync Profiles Across Social Networking Sites' [online], Jan. 4, 2007 [retrieved on Oct. 2, 2008]. Retrieved from the Internet< URL: http://www.associatedcontent.com/article/117466/profilelinker_launches_and_lets_users.h?cat=15>.

Microsoft Corporation, 'Person Synchronization with Windows SharePoint Services' [online], [retrieved on Oct. 2, 2008]. Retrieved from the Internet< URL: http://msdn.microsoft.com/en-us/library/ms563846.aspx>.

'User Profiles: Why do my changes not show in other sites?' [online], [retrieved on Oct. 2, 2008]. Retrieved from the Internet< URL: http://www.21apps.com/sharepoint/user-profiles-why-do-my-changes-not-show-in-other-sites/>.

'KDS Launches New Profile Synchronization Module' [online], [retrieved on Oct. 2, 2008]. Retrieved from the Internet< URL: http://www.kds.com/en/kds-launches-new-profile-synchronization-module>.

'Facebook Cuts Google's 'Friend Connect' Out of API Program' [online], [retrieved on Oct. 2, 2008]. Retrieved from the internet:< URL: http://www.marketingvox.com/facebook-cuts-googles-friend-connect-out-of-api-program-038636/.>.

'GoldSync helps your team work together' [online], [retrieved on Oct. 2, 2008]. Retrieved from the internet:< URL: http://www.goldmine.com/common/Files/Xtra_Sites/GoldMine/SMRM_GoldSync_Brochure_NA_EN.pdf>.

O. Drodgehorn et al. "Personalised applications and services for a mobile user" [online] (abstract) [retrieved Oct. 2, 2008]. Retrieved from the Internet< URL: http://ieeexplore.ieee.org/xpl/freeabs_all.jsp?tp=&arnumber=1452113&isnumber=31027>.

Eric Eldon, 'MySpace to launch "data availability"—new ways to access its data through third party sites', [online], May 8, 2008 [retrieved on Oct. 2, 2008]. Retrieved from the Internet< URL: http://digital.venturebeat.com/2008/05/08/myspace-to-launch-data-availability-new-ways-to-access-its-data-through-third-parties/>.

Stan Schroeder, '20 Ways to Aggregate Your Social Networking Profiles' [online], Jul. 17, 2007 [retrieved on Oct. 2, 2008]. Retrieved from the Internet< URL: http://mashable.com/2007/07/17/social-network-aggregators/>.

Clint Boulton, 'Facebook, Google to Join MySpace in Data Portability' [online], May 11, 2009. [Retrieved on Oct. 2, 2008]. Retrieved from the Internet< URL: http://www.eweek.com/c/a/Messaging-and-Collaboration/Facebook-Google-to-Join-MySpace-in-Data-Portability/>.

* cited by examiner

ORACLE

Gallery | Recent ▼ Favorites ▼ Search [All ▼] [  ] You are logged in as <UserName>
Gallery | My Portrait | [EDIT PUBLIC SETTINGS] [VIEW PUBLIC INFORMATION] ⊕⊙ ⚙Preferences Help Logout Luke Wilson > Helen Hunte > Leslie Hann

Leslie Hann, Senior Manager

Personal Status  Holidaying in Hawaii!
(updated 12:30 PM from Facebook)
Department  Accounting Personal Statement  For the last ten years MORE...
Manager  Helen Hunte
Current Time  12:30pm
Hire Date  12-Jun-1990

[ACTIONS ▼]

Edit Image ( Activities & Interests ) ( Development & Growth ) ( Career Planning ) ( Contact Information ) ( Employment ) ( Experience & Qualifications ) — 1605

⇧

Experience and Qualifications
Area of Expertise —1640
Integrity, Customer Service, Commitment 1645 ⟶ Skills and Qualifications — 1610

<u>Competencies</u>
Teamwork, Leadership, Communication, Java —1630

<u>Accomplishments</u>
Recognition of the Accounting Department
Budget per Project Financial Run, MORE.....

<u>Awards and Honors</u>
Award of Excellence

<u>Affiliations</u>
AFA Association, CPA Association

1620 ⟶ <u>Schools</u>
Bachelor's in Business – Illinois State U

<u>Licences and Certificates</u>

Performance Evaluations

RATING
Q1 Q2 Q3 Q4

ORACLE

Personal Gallery  Recent ▼ Favorites ▼ Search [All ▼] [    ]   You are logged in as <UserName>
Gallery | My Portrait                                                      ⊕⊖ ≈Preferences Help Logout
Luke_Wilson > Helen_Hunte > Leslie_Hann

Edit Skills & Qualifications  [Review] [Save as Draft ▼] [Submit] [Cancel]
Select the content you would like to edit or add a new content type Accomplishments (3)   Competencies (4)   External Vendor Training (1)
Awards and Honors (1)  Schools (1)        Languages (3)
Affiliations (2)       Internal Learning (3)  License and Certificates (1)

Content Type [ ▼ ] [Add]

| School | | |
|---|---|---|
| [Create] [Delete] | Area of Study | School | Date Acquired |
| Degree | | | |
| Bachelor's Degree | Business | Illinois State U | 01/01/1998 |

Update History
Last Updated On 10/13/2006
Updated Areas   Competencies
                Experience
                Education
        Status  Pending

| Updated Date | Status |
|---|---|
| 08/30/2006 | Rejected |
| 03/06/2006 | Approved |
| 12/15/2005 | Approved |
| 11/23/2005 | Returned |
| 09/18/2005 | Approved |

Proficiency Level Description
Communication:

5 – Exceptional. The employee demonstrates thorough knowledge and mastery of skills that allows him/her to act as a coach or team lead of 1700
1705
1710
1715
1720
1725
1730
1735
1740
1745
1750

FIGURE 17

ORACLE

Personal Gallery | My Portrait

Gallery | My Portrait

Luke Wilson > Helen Hunte > Leslie Hann

Recent ▼ Favorites ▼ Search [All ▼]

You are logged in as <UserName>

🅿️ 🛠️ Preferences Help Logout

Edit Skills & Qualifications [Review] [Save as Draft ▼] [Submit] [Cancel]

Select the content you would like to edit or add a new content type

Accomplishments (3)   Competencies (4)   External Vendor Training (1)
Awards and Honors (1) Schools (1)        Languages (3)
Affiliations (2)      Internal Learning (3) License and Certificates (1)

Content Type [ ▼ ] [Add]

— 2005

| School | | | |
|---|---|---|---|
| [Create] [Delete] | 1730 | 1735 | 1740 1745 |
| Degree | Area of Study | School | Date Acquired |
| Bachelor's Degree | Business – Illinois State... | | 01/01/1998 |
| Master's Degree | Management – New Yor... | | 06/01/2000 |
| PhD Degree | Management – Stanford... | | 01/01/2005 |

{ 2010

Update History

Last Updated On 10/13/2006
Updated Areas Competencies
Experience
Education
Status Pending

| Updated Date | Status |
|---|---|
| 08/30/2006 | Rejected |
| 03/06/2006 | Approved |
| 12/15/2005 | Approved |
| 11/23/2005 | Returned |
| 09/18/2005 | Approved |

Proficiency Level Description

Communication

5 – Exceptional. The employee demonstrates thorough knowledge and mastery of skills that allows him/her to act as a coach or team lead of other employee at the same level.

4 – Outstanding. The employee

| Add Service | 2410 2405 | | | 2415 |
|---|---|---|---|---|
| Service Name | Plaxo ▼ | | Date | Dec-12-2008 |
| Protocol | OpenSocial ▼ | | | |

Comments
2420 [          ]

▦ Field Mappings — 2425

------------

+ x

| Plaxo | Oracle App. |
|---|---|
| Achievements | Accomplishments |
| Memberships | Affiliations |
| Career Goals | Career Statement |
| Personal Status | Status |
| Education ▼ | Schools ▼ |

2440 { rows }   2430 { rows }

2445   2450   [Cancel] [OK]   2460

FIGURE 24

Add Service

Service Name: Plaxo
Protocol: OpenSocial    Date: Dec-12-2008
Comments:

▢ Field Mappings

+ ✗

2605

| Plaxo | Source of Truth | Oracle App. | Source of Truth |
|---|---|---|---|
| Achievements | - | Accomplishments | Y |
| Memberships | Y | Affiliations | - |
| Career Goals | - | Career Statement | - |
| Personal Status ▷ | Y | Status | - |

2620 — 2610 — 2615 — 2600

[Cancel] [OK]

FIGURE 26

DATA MANAGEMENT BETWEEN MULTIPLE DATA SOURCES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A. Technical Field

The present invention pertains generally to data processing, and relates more particularly to management of data between a plurality of services.

B. Background of the Invention

Recently, a number of competing and complementary social network services have been created. These social network services are generally available through web sites on the Internet. To compete, these social network sites offer different types of services or focus on different market segments. For example, some sites are more suited for connecting with personal friends, while other sites are more business-oriented. Each of these social network services typically requires a user to provide user-specific profile information. All of the sites require or store some amount of personal profile information, such as, for example, a personal summary statement, status, past experience, qualifications, interests, contact information, and the like.

In addition to services offered through Internet web sites, private sites (intranets) also provide social networking or interactive services. For example, a company may provide one or more intra-company services that include the use of user information, such as a human resources management system. The company may maintain intra-company user web pages and may provide intra-company communication applications, including instant messaging, email, bulletin boards, and the like. For users, the company services also provide additional locations in which the users must update their information.

Because the services offered by these social network sites vary, many individuals maintain accounts on multiple sites. To maintain the user's profile information, an individual must log into the sites and update the same, or related, information multiple times. For example, if a user changes her summary statement in one social network application, she must also remember to change it in all the other sites where she wants the same statement to appear.

SUMMARY OF THE INVENTION

Accordingly, what is needed are systems and methods that provide a user the ability to control her information and leverage existence of information stored with one service provider to easily propagate some or all of that information to one or more other service providers.

Embodiments of the present invention enable management of data between a plurality of sites or service providers. Presented herein are systems and methods that facilitate the portability and management of user data maintained at two or more services. In embodiments, a configurable profile management interface or interfaces are provided to a user, which enable the user to identify data elements that may be maintained across one or more services. In embodiments, a user has the ability to set precedence values by identifying which elements from which service or services should be considered as sources of truth. In embodiments, those sources of truth may be used to propagate changes to one or more services. In embodiments, the profile synchronization functionality may be incorporated within an HR system. In embodiments, the user can also configure a schedule for transferring data, can import some or all of the data, and/or can export all or some of the data.

In embodiments, a computer-implemented method for transferring data between services comprises displaying one or more interfaces to a user to aid the user in defining mappings and in order to access and transfer data to appropriate data fields. In embodiments, the method comprises displaying to a user a first set of fields available from a first service that operates on a first computer system. When a user desires to edit data associated with first set of fields, the user can select to edit the appropriate field. The user may directly enter the data or may identify a service to transfer data to, to transfer data from, or both. To facilitate the transfer, a user interface displays a second set of fields available from the second service. In embodiments, the available fields from the second service may be ascertained by interfacing with the second service via a preset protocol. In embodiments, a user interface facilitates the mapping of at least one field of the first service with at least one field of the second service.

In embodiments, the mapping includes precedence values wherein the field with the source data is identified. Thus, as part of the transfer, the source data in one service is transferred to the mapped destination field or fields in the other service provider.

In embodiments, at least one of the first and the second fields comprises multiple subfields and the mapping also comprises a parsing that defines a segmenting or aggregating of the set of transferred data relative to the multiple subfields.

In embodiments, the transferred data may be displayed to the user in a draft mode. The draft mode may be presented to the user in an interface that is configured to display the transferred data and is configured to receive the transferred data as edited by the user. After editing, the edited transferred data can be saved and associated with appropriate data field according to the defined mapping.

In embodiments, user-defined mappings are saved for future reference and/or use. In embodiments, a user request to transfer may include setting a schedule of transfers and the data is transferred between services according to the schedule.

In embodiments, the data transfer may be an import, an export, or both. In embodiments, the data transferred from a source field to a destination field according to a mapping may overwrite any data in the destination field, pre-pend any data in the destination field, or post-pend any data in the destination field.

In embodiments, the present invention may be part of a human resources application utilized in an enterprise context. In embodiments, an enterprise system includes a profile management application that provides a configurable system for identifying elements of a user's profile that may be maintained across multiple services. The profile management system helps the user enter and maintain accurate data in the enterprise application. In embodiments, the system includes a profile management system that allows a user to transfer data between the enterprise application and one or more third-party services. To facilitate the transfer of data, the profile management system includes one or more user interfaces for configuring mappings between elements in the enterprise application and elements in the services. The user may also configure a precedence value, whereby a certain element or elements from a source can be identified as the source of truth for that item. In embodiments, the user can also configure a schedule for transferring data, can import some or all of the data, and/or can export all or some of the data.

In embodiments, the application interface includes a link or links to export, import, or both, some or all of the data.

In embodiments, the present invention may be embodied in a computer program product comprising at least one computer-readable medium storing one or more sequences of instructions.

Although the invention is explained in the context of user data, it shall be understood that the invention may be applied to other types of data.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 16 depicts illustrates a user interface for displaying profile data associated with a user according to various embodiments of the invention.

FIG. 17 depicts an embodiment of a user interface for editing a page that contains multiple elements according to various embodiments of the present invention.

FIG. 20 depicts the user interface of FIG. 17 that has been updated with the imported data according to various embodiments of the invention.

FIG. 24 illustrates an embodiment of a user interface to define elements and mappings between services according to embodiments of the invention.

FIG. 26 depicts an alternative interface for defining mappings between two or more sources of data according to various embodiments of the invention.

DETAILED DESCRIPTION OF THE PREFERRED EMBODIMENTS

Figure 1:
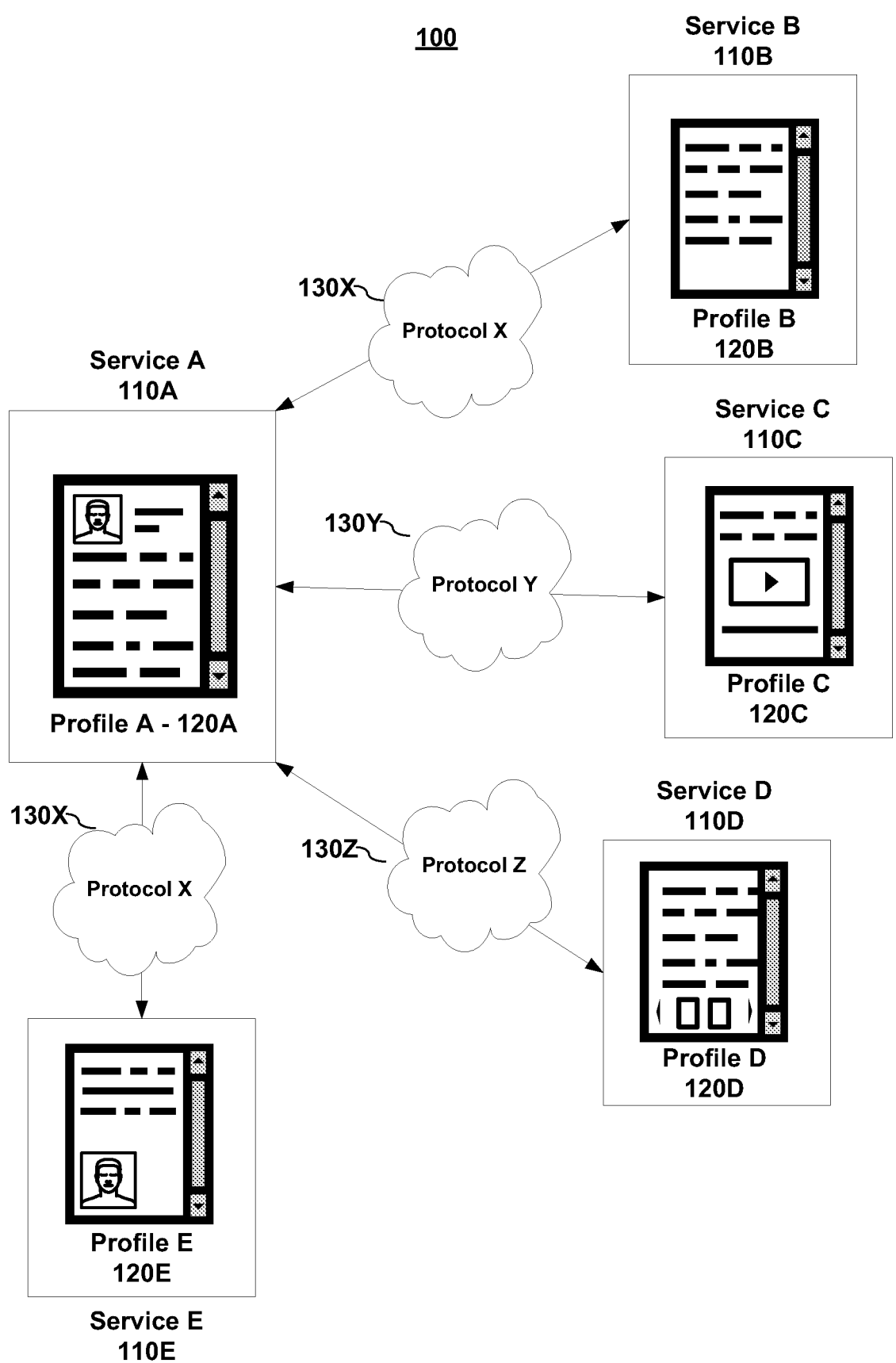
FIG. 1 illustrates interactions between services to allow a user to manage data associated with the various services according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the examples described below are illustrative of specific embodiments of the invention and are meant to avoid obscuring the invention. Furthermore, although the invention is explained in the context of user data, it shall be understood that the invention may be applied to other types of data.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment. It shall be understood that a set may comprise zero or more members and that references to data or a set of data includes no data (i.e., empty set).

It shall be noted that the interfaces depicted herein are presented for purposes of illustration and not limitation. Also, the interfaces may be integrated together or further divided. It shall also be noted that the mapping and managing of data need not be simply one-to-one. Rather, the present invention may be implemented in one-to-one, one-to-many, and many-to-one mapping configurations.

A. Overview

Internet services, particularly social networking services, are collecting increasing amounts of data from individuals. Individuals find value in providing "volunteered" data because it helps facilitate the services provided by these various services. Although users submit information to these services, users typically have a strong sense of ownership regarding their data contained at these sites, particularly when the services are social networking services. Because the services offered by these social network sites vary, many individuals maintain accounts on multiple sites. To maintain the user's profile information, an individual must log into the site and update the same, or related, information multiple times. Many users find the overhead associated with maintaining these accounts time consuming and troublesome, particularly because of the large amount of duplicated efforts. If the data associated with the various services were portable, it could be utilized by systems beyond the scope of the initial services. For example, a company's human resources (HR) systems can greatly benefit by having access to some or all of the data housed at third-party services sites.

Accordingly, presented herein are systems and methods that facilitate the portability and management of user data maintained at two or more sites. In embodiments, a configurable profile synchronizing interface or interfaces are provided to a user that enable the user to identify data elements that may be maintained across one or more sites. In embodiments, a user may also have the ability to identify which elements from which site or sites should be considered as sources of truth. In embodiments, those sources of truth may be used to propagate changes to one or more other sites. In embodiments, the profile synchronization functionality may be incorporated within an HR system.

Accordingly, the present invention provides a much easier and more efficient means for a user to populate a profile with data previously entered in one or more other, unrelated or third-party sites. Furthermore, a user can more easily and more efficiently manage updates to profile data for multiple sites. In embodiments, the user can control the sharing of data across the sites, including the sharing of internal company profile data. By improving the sharing and updating of information, the sites, including internal company sites, that utilize the data can better serve the user. For example, by facilitating the inputting of user profile information, both the company and the user/employee can benefit. The company and user benefit by having current and more complete user information because the company can use the information to help keep the employee engaged, to help match employees with tasks, to help match employees and mentors, and the like.

Consider, by way of illustration, the system 100 displayed in FIG. 1. FIG. 1 illustrates the interaction between services 110x to allow a user to manage the data associated with the various services according to various embodiments of the invention. Associated with service 110A is a user profile, Profile A 120A. Likewise, associated with each of the other services 110B-110E is a user profile, Profile B-E 120B-E, respectively. A user profile may contain a number of types of information including, without limitation, user name, contact information, interests, preferences, schedules, contacts, etc. A user profile may also contain a number of types of information including without limitation, text and multimedia data (such as, by way of illustration and not limitation, pictures, video, music, images, etc.).

As depicted in FIG. 1, service 110A may interact with one or more of the other services 110B-E via one or more protocols 130. For example, Service A 110A may interact with Service B 110B and Service E using one protocol, protocol X 130X. And, Service A 110A may interact with Service C 110C and Service D 110D via different protocols, protocol Y 130Y and protocol Z 130Z, respectively. In embodiments, a protocol may be an open standard protocol, such as OpenSocial and Friend Connect. Alternatively, in embodiments, the protocols may be proprietary protocols developed by a service or developed between services. In embodiments, as new standards are developed or become available, these new standards may be added to a service.

Having a protocol between services allows for the interaction between services. For example, Service A 110A may retrieve and/or post data to one or more of the other services 110B-E. Being able to retrieve data, post data, or both to one or more other services allows a user associated with profile A 120A to leverage and control the data that exists about her. Consider, by way of illustration and not limitation, the following example.

Company ABC has implemented an Oracle application that includes a profile management application according to the present invention. Employee Josephine Smith joins ABC and is a member of several social networks, including LinkedIn and Facebook.

Josephine would like colleagues at Company ABC to know that she likes sailing, and that she achieved the XYZ Certification at her previous employer 123. This information, along with additional useful information about Josephine, is stored at one or more other social networks sites. Without implementation of the present invention, Josephine would be frustrated because, despite Company ABC having a social network to store and display this information, she would have to enter all her information again. This frustration and duplication of effort may cause Josephine to not re-enter this additional data at her work site.

Similarly, if Josephine achieves a new certification with Company ABC, she would have no way of easily adding that information to LinkedIn so that her wider business network is aware of her recently professional advancement.

By implementing the teachings of the present invention, Josephine can access one site, in this example, her profile page at Company ABC and manage data at one or more third-party sites. Via the company site, Josephine can identify her networks and choose how to synchronize information to and/or from each network with her profile data. In embodiments, the company's site may keep track of Josephine's open identification and network accounts.

An aspect of the present invention is that Josephine has control, and choice, over whether and what data will be transferred and how it will be transferred, as opposed to having something happen automatically, behind-the-scenes, that she cannot control. Thus, Josephine can indicate what information should be managed and which source of data is the source of truth for a specific content. For example, Facebook may be designated as the source of truth for recreational interests, Company ABC's profile may be designated as the source of truth for her professional credentials, and LinkedIn may be designated as the source of truth for her prior work history and professional memberships.

Via one or more interfaces provided through Company ABC's profile management service, Josephine can transfer some or all of that data. It should be noted that Josephine initiates the transfer of the data but she does not have to re-enter the data. In embodiments, her imported data is displayed to her online so that she can edit some or all of the data, if she chooses to do so. For example, she may wish to make some of the imported data more appropriate for the Company ABC audience.

An aspect of the present invention is that it allows an enterprise, by providing this utility within its company and by having this based on a person's profile in the company's enterprise system (as opposed to open social data outside the enterprise), to have its employees keep and maintain employee data within its network. Thus, the company has value because its employee data is more likely to be complete, more likely to be accurate, and more likely to be current. It is in the enterprise's interest for employees to keep what they are doing outside the company current with what is happening in their company profile, and employees are far more likely to do so when they have a convenient and easy method to do so, while still retaining full control of the process.

It should be noted that this profile data interaction is not intending to be an aggregator that compiles everything together and requires the user to sort it. Rather, it makes the populating of data fields in one profile, such as the profile at Company ABC, easy and effective by accessing other sources. In addition, in embodiments, it gives an added benefit of allowing the user to move the data from within an internal profile to an outside network or networks.

Thus, by allowing mapping of data fields between services, by allowing real-time user feedback or editing, and by allowing the designation of sources of truth, a user has effective control and management of her data across dispersed sites.

It shall be noted that one value of the present invention is in offering access to services using recognized open standards. And, for new standards, a value of the present invention is in the ability to create new connections and mappings without requiring an upgrade to a profile management application.

Also, a significant value is that individual users benefit from owning and managing their data in multiple places, while still providing an enterprise organization with the accurate data it requires to benefit its business.

Furthermore, allowing users the ability to manage their profile in multiple places creates greater efficiency and time-saving. By having the profile management features described herein, users can update various profile items in one site and manage the transfer of those items across multiple sites from the one site.

Having centralized profile management yields better consistency and reliability of data. For users with accounts on multiple sites, it is difficult to remember the sites they have updated and those they have not. This complexity of tracking the updating of multiple sites can lead to unintended inconsistencies and out-of-date information. Having a centralized profile management allows the user to keep multiple sites up-to-date and to track updates and revisions.

Furthermore, having a centralized profile management system respects the individual user. It gives the individual ownership of his or her profile data, to manage it how he or she sees fit; yet, it also gives an enterprise organization accurate employee data.

B. Embodiments of Methods for Managing Data between Services

Figure 2:
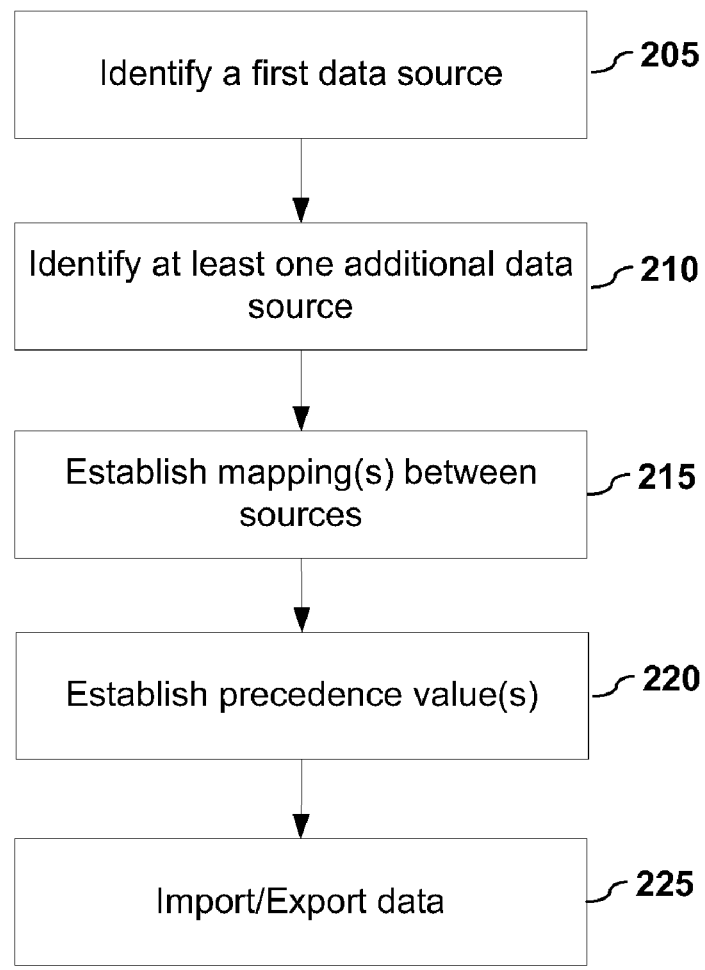
FIG. 2 depicts a method for managing of a user's data between two or more sources of data according to various embodiments of the invention.

FIG. 2 depicts a method for managing a user's data between two or more services according to various embodiments of the invention. As illustrated in FIG. 2, a user identifies (205) a first source of data. That source of data may or may not contain data fields that are populated. For example, the source of data may be a profile in an enterprise application that has yet to be populated with data. In embodiments, a user accesses a service that facilitates the management of user data, and the profile associated with that service may be selected by default as the first source of data. The service may be integrated within a larger set of service offerings or may be a standalone service. In embodiments, the service is part of a company's internal service or may be an outside service, such as an Internet service.

As illustrated in FIG. 2, a user identifies (210) at least one additional source of data. For purpose of this disclosure, an additional source is a source that is separate from the management/synchronization service, which source may be a third-party source or a source within the same entity as the management/synchronization service but a separate service or application.

Having identified at least one additional source of data, a mapping is developed (215) between elements, or data fields, in the first source of data and elements in the second source of data. For example, there may be a mapping between "address" fields in the first source of data and "contact information" in the second source data. In embodiments, a protocol, such as by way of example and not limitation, OpenSocial, can facilitate the mapping between elements. In embodiments, a protocol defines application programming interfaces (APIs) for retrieving information from and posting to a source of data. Elements that are accessible by the second source of data can be displayed to the user, and the user may select which field or fields in the first source of data should be mapped to a field or fields in the second source.

In embodiments, as part of the mapping, a user can indicate, for an element, a precedence value as it relates to the sources of data. For example, the user may identify the flow of data for an element or elements—whether the first source of data should overwrite the second source of data, whether the second source of data should overwrite the first source of data, or whether neither source of data has a higher precedence than the other. In embodiments, the precedence may be set per element, per group of elements, per source of data, or a combination thereof.

Having established a mapping between sources of data and having indicated a precedence for elements, the user can import, export, or both (225) data between the two sources of data.

C. Alternative Embodiments of Methods for Managing Data between Services

Figure 3:
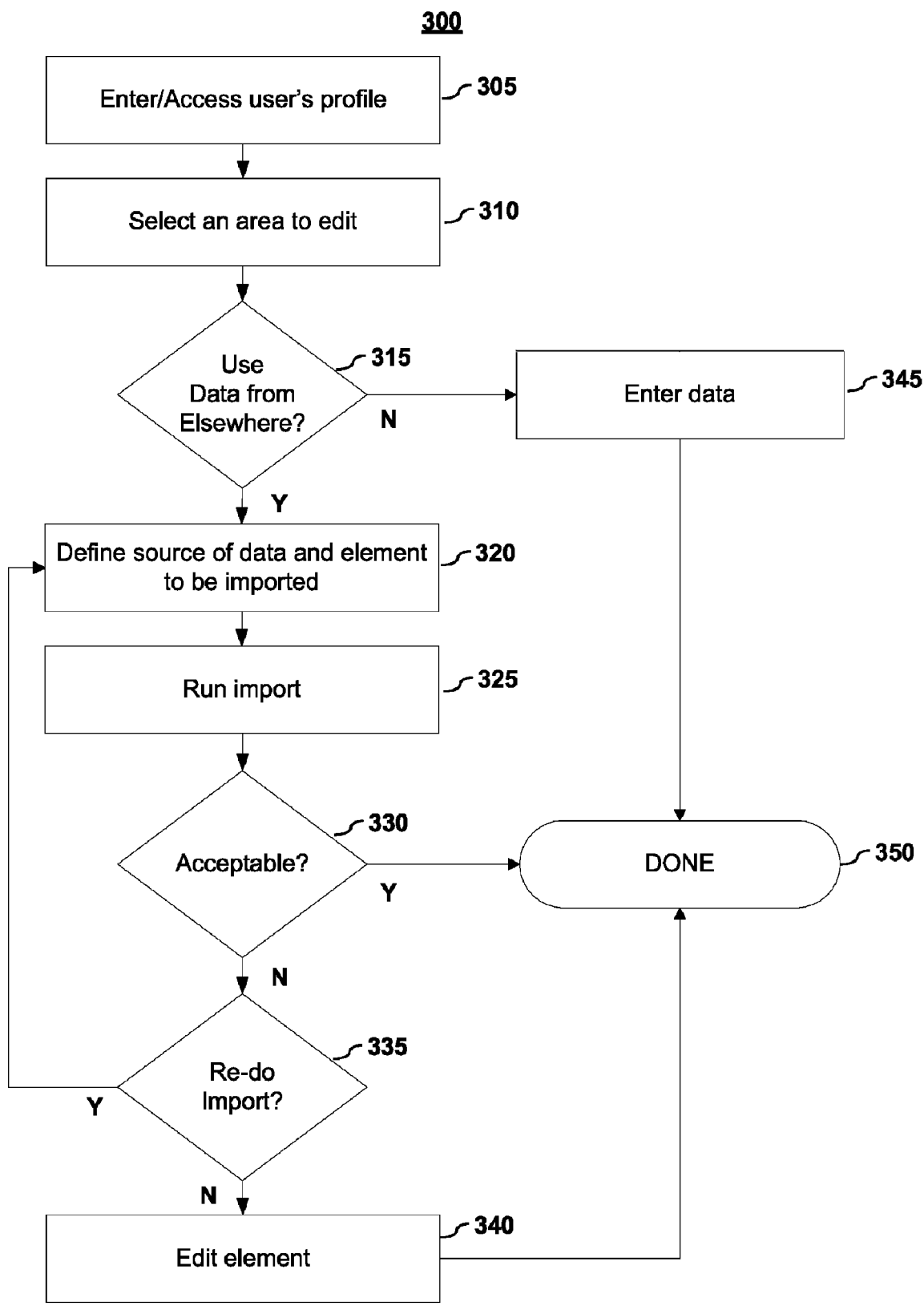
FIG. 3 illustrates a method for managing a user's data between two or more services according to various embodiments of the invention.
Figure 4:
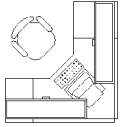
FIG. 4 illustrates a user interface for displaying profile data associated with a user according to various embodiments of the invention.

FIG. 3 illustrates a method for managing a user's data between two or more services according to various embodiments of the invention. As depicted in FIG. 3, a user enters or accesses (305) the user's profile. In the embodiments described herein, the user's profile is provided as part of a company's human resources application. The user's data may be displayed as part of a user interface that functions in part to help facilitate the management of the user's data, but it may have additional functions as well. FIG. 4 illustrates an exemplar user interface 400 for displaying profile data associated with a user according to various embodiments of the invention. As shown in FIG. 4, a user's portrait or profile data is presented as part of a company's internal services. The portrait 400 displays information associated with that user, including but not limited to, the user's name 405, job title 420, personal statement 425, current status 430, contact information 450, employment information, development and growth information 410, career planning, and experience and qualifications 415. One skilled in the art shall recognize that the particular contents and layout are not critical to the present invention.

In embodiments, all of the user's data may be displayed within a single page, or alternatively, data may be displayed in separate or supplemental pages. In the embodiment depicted in FIG. 4, a main page 400 exists that displays some information and links to additional pages are provided. For example, summary sections for some areas, such as the most frequently used areas, may be provided on the main page, but more detailed information for an area can be obtained by selecting a link to that area of information. In embodiments, if a person wanted more detailed information about the contact information, the person could click or otherwise select the contact information summary box 450. Alternatively or in addition to selecting a summary box, tabs of areas 435 can be displayed for selecting. Thus, if more detailed information about the contact information were desired, a user could select the tab labeled "Contact Information" 440. One skilled in the art shall recognize that there are a number of ways to display data and that no particular way is critical to the present invention.

Returning to FIG. 3, a user may desire to add or edit information associated with a particular area. To do so, the user selects (310) an area to edit.

Figure 5:
FIG. 5 illustrates an interface for displaying profile data associated with a user and for providing an interface for a user to manage the user's data according to various embodiments of the invention.

FIG. 5 illustrates an interface for displaying profile data associated with the user and for providing an interface for the user to manage the user's data according to embodiments of the invention. For the purposes of illustration, it will be assumed that the user desires to edit his career statement. The user has selected the "Career Planning" section of the user's profile from the main page 400, which has opened or linked to an expanded view 505 of the Career Planning section. Within the expanded "Career Planning" section 505 is a display of associated data, such as career preferences, career interest, mentor, and career statement. As illustrated in FIG. 5, there is no data associated with the career statement element 510. Provided as part of this interface is a button or link, in this example the word "edit" 515, to facilitate the user's indication of which area he wants to edit. By selecting the "edit" 515 link associated with the "My Career Statement" element, the user can edit the data field associated with that element. If the user desired to edit a different section, he could select the "edit" associated with that section. For example, by selecting "edit" 520 associated with "Mentor Relationships," the user can edit data associated with the section, such as, by suggesting a mentor or mentors. In embodiments, the number of data fields associated with an edit indicator may be one or more.

Figure 6:
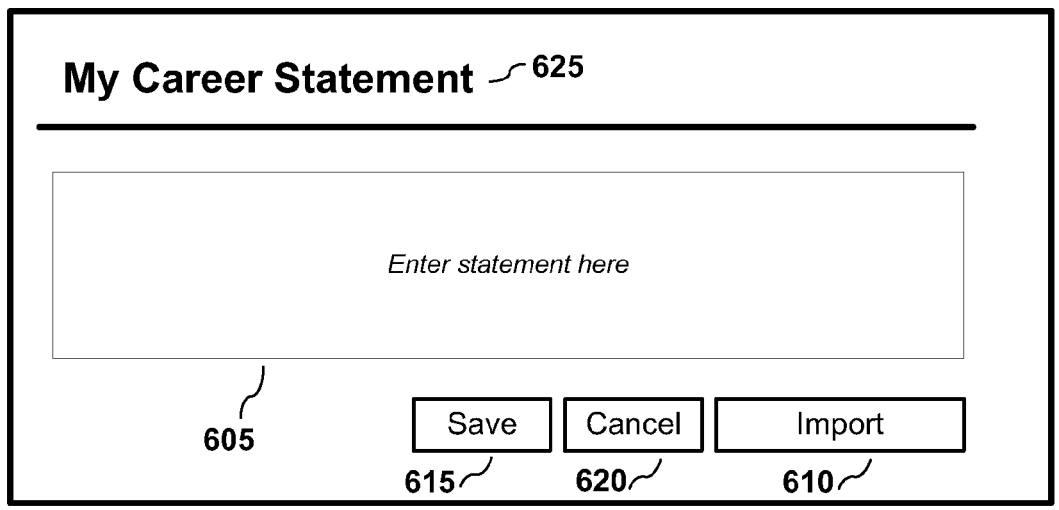
FIG. 6 depicts an interface for allowing a user to input data according to various embodiments of the invention.

In this illustrated embodiment, upon indicating that the user desires to edit the "My Career Statement" section, a user interface is displayed to allow the user to edit the data. FIG. 6 depicts an interface 600 for allowing a user to input data according to various embodiments of the invention. One skilled in the art shall recognize that there are a number of ways to accept input data from a user and that no particular method is critical to the present invention; thus, the interface may be part of the display 500 or may be separate window, such as a pop-up dialog window, as depicted in FIG. 6.

The interface 600 depicted in FIG. 6 displays the title of the section of referring section 625, in this case "My Career Statement." Having the referring title 625 is beneficial, particularly when the interface is a separate window, because it helps keep the context for the user. The interface 600 provides an area 605 that is configured to receive input from the user. The user may enter text or other data into section 605. Also provided in the user interface 600 are buttons or links, which allow the user to save 615 entered data, to cancel 620, or to import 610 data from a third-party source. For purpose of this disclosure, a third-party source is a source that is separate from the management/synchronization service from which the user has accessed his portrait information. Thus, a third-party source may be an external source or may be a source within the same entity as the management/synchronization service but separate from the management/synchronization service. The "Import" functionality 610, allows the user to choose (310) between entering the data into field 605 or obtain information from another source.

If the user does not wish to use data from another source of data, the user can directly enter the data into field 605 and save the newly entered data by selecting the "Save" button 615. A user may want to enter the data directly if no other data exists.

Even if similar data does exist, the user may not want to use it. Aspects of the present invention provide the user control over the use or the non-use of data that exists in other locations. However, assuming that other data does exist that could be used for this selected element, the user may import that data by selecting the "Import" button 610.

If the user wants to import the data from another source, the user can define a source of data and an element to be imported (320). In embodiments, an interface is presented to the user to facilitate the selection of a source, to facilitate the mapping between the fields, and to facilitate the identification of the source of truth for this data.

Figure 7:
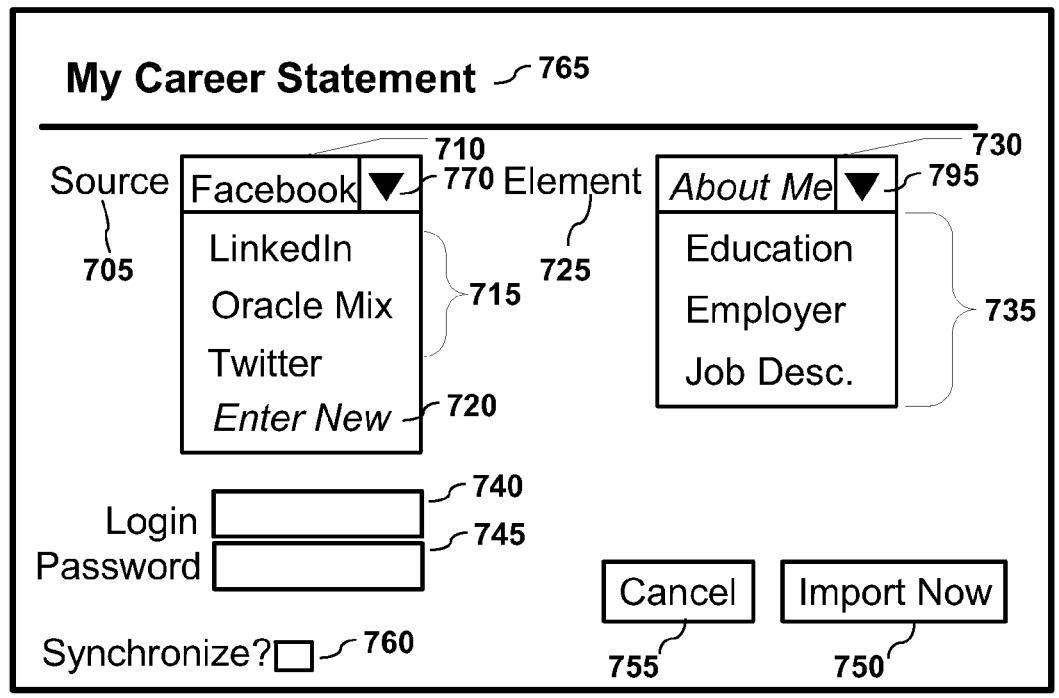
FIG. 7 depicts an interface that allows a user to define mappings of elements between services according to various embodiments of the invention.

FIG. 7 depicts an interface 700 that allows a user to define mappings of data fields between a third-party service and the current profile according to various embodiments of the invention. Similar to the interface 600 depicted in FIG. 6, the interface 700 in FIG. 7 displays the title of the referring section 765, in this case "My Career Statement." As noted previously, having the referring title 765 is beneficial, particularly if the interface is implemented as a separate window, because it identifies the element that is being mapped. The interface 700 provides a section 705 in which the user can select the third-party source of data. In embodiments, the listing of sources of data may be pre-populated. For example, in the embodiment depicted in FIG. 7, a dropdown box 770 is displayed within the interface 700. Selecting the dropdown box 770 displays to the user a listing of sources of data 715. The user can select a source of data 710, in this case Facebook 710, from the listing 715. In embodiments, if a source of data is not in the listing 715, a user may add a new source of data. For example, in the depicted embodiment, included in the dropdown 770 is an "Enter New" option 720. By selecting the "Enter New" option, the user can be prompted to identify a new source of data. In embodiments, the user may supply a pathway or URL to the new source of data.

Also depicted in FIG. 7 is a display of the elements available from the selected source of data. In embodiments, once the source is identified 710, available mechanisms (for example API, XML) for that source of data can be ascertained and used to populate the listing 735 of elements 725. In embodiments, the elements that are available at the selected source 710 can be known by querying the source or may be known from previous interactions with that source.

In embodiments, the ability to add a new source of data and/or to define mappings is restricted to system administrators. For example, in embodiments, a user may identify a new source of data to a system administrator via the "Enter New" option discussed above, but before being allowed to interact with this source of data, the user must wait until an administrator has added the new source of data and has defined mappings. Embodiments of adding new sources of data and defining mappings are explained in more detail below.

In embodiments, the interface may have tiered display of data available from a source of data, wherein the listing in a subsequent tier is determined by the prior tier. For example, a source of data may have three general areas: "Work History," "Contact Information," and "Education" with data fields associated with each of those three element groups. If "Contact Information" is selected at the first tier, the second tier listing may be all of the fields under that general area (e.g., "Home Address 1," "Home Address 2," "Home City," "Home State," "Home Phone," "Work Address 1," "Work Address 2," "Work City," "Work State," "Work Phone," etc.).

In the depicted embodiment, in the Element 725 listing 735, the user has selected "About Me" 730. It should be noted that this process creates the mapping between an element in the first source of data ("My Career Statement," in this example) to the element in a second source of data ("About Me" in Facebook, in this example). In embodiments without explicit precedence setting, the mapping inherently includes precedence in that the first source of data is being overwritten by the second source of data for this element. Alternatively, the interface may receive or prompt for a precedence value to set the source of truth between these elements and services.

Having identified the source of data and the element to be imported (320), the user can import (325) the data in the current application. In the interface depicted in FIG. 7, an "Import Now" button 750 is provided to allow the user to initiate the importing process. It should be noted that the interface 700 depicted in FIG. 7 can also receive a login 740 and password 745. If the selected source of data 710 is password protected, the login and password information may be needed to access the element to be imported. Interface 700 may also include an option to synchronize 780 the data at set intervals, which will be described in more detail below.

Figure 8:
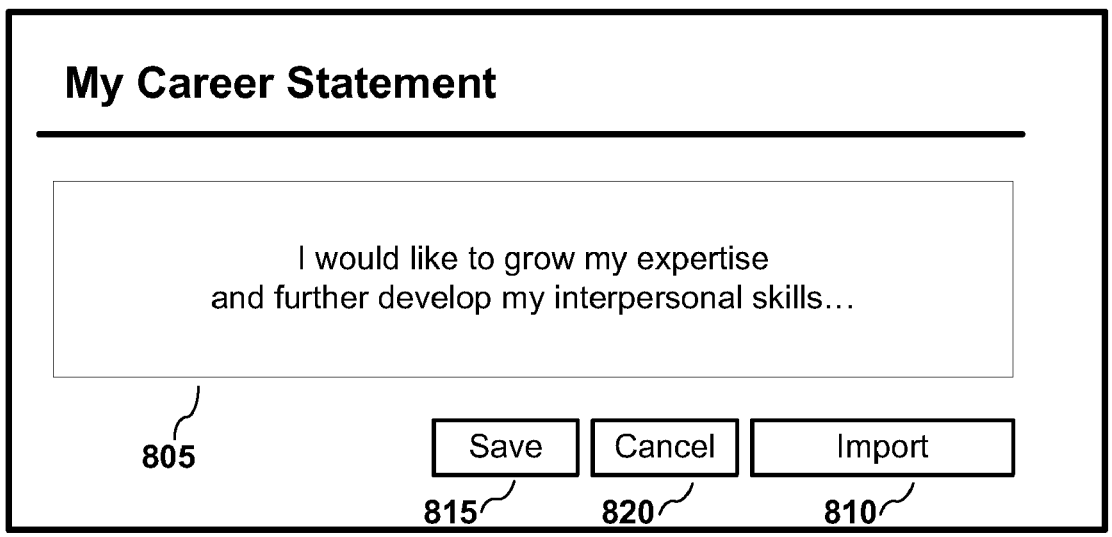
FIG. 8 illustrates an interface that provides a draft display of imported data according to various embodiments of the invention.

In embodiments, after having imported the data element, a draft of the imported data can be displayed to the user. FIG. 8 illustrates an interface 800 that provides a draft display of imported data according to various embodiments of the invention. In this embodiment, the interface 800 is the edit interface of FIG. 6 that has been updated with the imported data. Having a draft display allows a user to preview (330) the imported data. The user can determine if the imported data is acceptable (330) by previewing or editing the imported data before it is saved within the first source of data. This preview and edit ability is advantageous for at least a few reasons.

Figure 9:
FIG. 9 illustrates the profile interface of FIG. 5 with updated data associated with a user obtained from a third-party service according to various embodiments of the invention.

First, the user may have mis-mapped the elements between the sources. In that case, the user may want to cancel the importing by selecting the "Cancel" feature 820. Alternatively, the user may re-try (335) the mapping process by selecting the "Import" 810 button, which, in embodiments, may return the user to the interface depicted in FIG. 7. Second, the user may have incorrectly remembered the contents associated with the mapped element. That is, the user may have thought that the data would be appropriate to import but upon inspection realizes that the imported data does not satisfy the user. Third, having the ability to preview and edit allows the user to address validation errors. For example, a date might be imported from a second source in a format not recognized or valid in the first source, which could cause an error that the user can then correct. Finally, the draft display may allow the user to edit (340) the imported data. For example, the imported data may contain the bulk of the information that the user wanted to import, but the user may want to alter the data for the destination service. In the present example, the user may want to leverage the prior statement by importing it (so the user does not have to reenter the data), but the user may want to change the tone or expand upon the imported statement. Assuming that the imported data (or an edited version of the imported data) is acceptable, the user may save 350 the data within the first source of data by selecting the "Save" button 815. FIG. 9 illustrates the profile interface 900 of FIG. 5 with the updated data 905 associated with the My Career Statement element obtained from a third-party service according to various embodiments of the invention.

It shall be noted that the above example used to illustrate the general methods associated with FIG. 3 represents the data management of an element (e.g., My Career Statement) that is a multi-line editable field. One skilled in the art shall recognize that the present invention may be applied to other field types and configurations. Presented below are two additional examples: single-line editable fields and separate editable pages with multiple fields. The examples are provided by way of illustration and not limitation. One skilled in the art shall recognize that the teachings of the present application may be applied to numerous elements and configurations, which fall within the scope of the present invention.

D. Embodiments for Managing Data for a Single-Line Field

Figure 10:
FIG. 10 illustrates a user interface for displaying profile data associated with a user according to various embodiments of the invention.

FIG. 10 illustrates an user interface 1000 for displaying profile data associated with a user according to various embodiments of the invention. As shown in FIG. 10, a user's profile is presented as part of a company's internal human resources services. The profile 1000 displays information associated with that user, including but not limited to, the user's name 1005, job title, personal statement, personal status 1010, contact information, among other data. One skilled in the art shall recognize that the particular contents are not critical to the present invention, and one skilled in the art shall recognize that there are a number of ways to display data and that no particular way is critical to the present invention.

In the depicted embodiment, a user, in this case Leslie Hann, may update her "Personal Status" 1010 statement (i.e., "Swamped with work!") by selecting an edit feature. In embodiments, the edit feature may be activated by clicking or otherwise selecting the "Personal Status" text or the statement text 1020. In the embodiment depicted in FIG. 10, an edit button 1030, in the shape of a pencil, is associated with and is located by the status 1020. Selecting that edit button 1030 initiates the editing of the personal status text 1020. In embodiments, a dialog box is displayed that provides an interface by which the user may enter the personal status.

Figure 11:
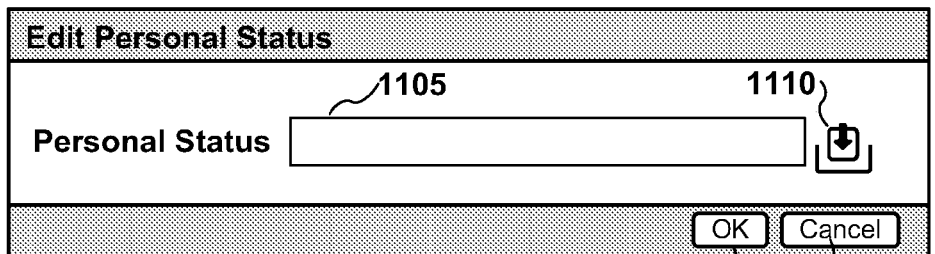
FIG. 11 illustrates an example of a dialog box that may be used to update a data field according to various embodiments of the invention.

FIG. 11 illustrates an example of a dialog box 1100 that may be used to update the personal status according to embodiments of the invention. Depicted in FIG. 11 is a user interface 1100 that provides a section 1105 that is configured to receive data for the personal status. The user interface 1100 also includes a button 1110 that, when selected, allows the user to import data for the personal statement from another service. In embodiments, once the user has indicated her desire to obtain data from another source by selecting the button 1110, an interface is displayed to the user to facilitate the importing of the desired data.

Figure 12:
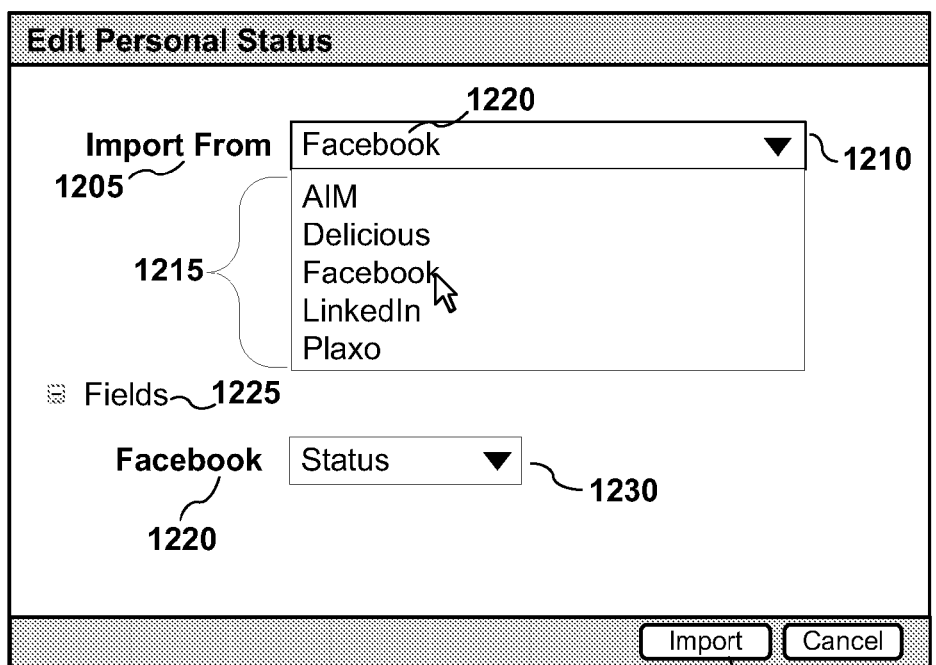
FIG. 12 illustrates an example of a user interface that allows a user to define mappings of elements between sources of data according to various embodiments of the invention.

FIG. 12 illustrates an example of a user interface that allows a user to define mappings of elements between services according to various embodiments of the invention. The depicted interface 1200 provides a section 1205 in which the user can select the other source of data from which to obtain the desired information. In embodiments, the user may be able to select from a list of services. For example, in the embodiment depicted in FIG. 12, a dropdown box 1210 is displayed within the interface 1200. Selecting the dropdown box 1210 displays to the user a listing of services 1215. The user can select a source of data 1220, in this case Facebook, from the listing 1215. In embodiments, if a service is not in the listing 1215, a user may add a new service. As discussed previously, the addition of new services may be restricted to an administrator.

Also depicted in FIG. 12 is a display of the elements or fields 1230 available from the selected source of data 1220. In embodiments, once the service is identified 1220, the elements that are available from that service 1220 are displayed to allow the user to select the element or elements, 1230. In the depicted embodiment, the Personal Status 1020 (FIG. 10) is being mapped to the "Status" element 1230 from the user's Facebook 1220 profile. The user accepts this mapping by selecting the "Import" button 1235, which causes the interface 1100 of FIG. 11 to update with the imported data.

Figure 13:
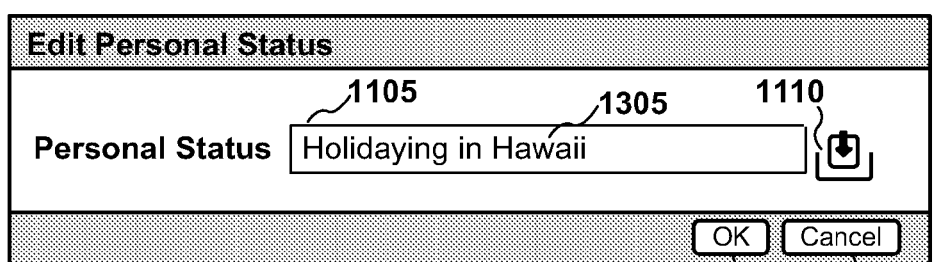
FIG. 13 depicts the updated interface of FIG. 11 in which imported data has been entered into the section that is configured to receive data according to various embodiments of the invention.

FIG. 13 depicts an updated interface 1300 of the FIG. 11 in which the imported data 1305 has been entered into the section 1105 that is configured to receive data for the personal status. In embodiments, the user may have several options including editing this information 1305, re-doing the import by selecting import button 1110, canceling 1120 the process, or accepting the personal status statement by selecting the "OK" button 1115. It shall be noted that the functionality of the interfaces depicted in FIGS. 11 and 12 may be integrated together into a single interface.

Figure 14:
FIG. 14 depicts the interface of FIG. 10 wherein an element has been updated with the imported data according to various embodiments of the invention.

FIG. 14 depicts the interface of FIG. 10 wherein the personal status 1010 has been updated with the imported data. As shown in FIG. 14, the personal status 1010 now includes the imported text "Holidaying in Hawaii" 1410.

In embodiments, update information is also recorded or recorded and displayed. For example, an indicator may be associated with one or more elements and when an associated element is updated, the indicator may also be updated. In the user interface 1400 depicted in FIG. 14, an indicator 1420 states that its associated element, Personal Status, was last updated at 12:30 PM from the source of data, Facebook. Have associated indicators and update history can be beneficial to the user for tracking which elements were updated, at what time, and from what source or sources of data.

E. Embodiments for Synchronizing Data between Services

Figure 15:
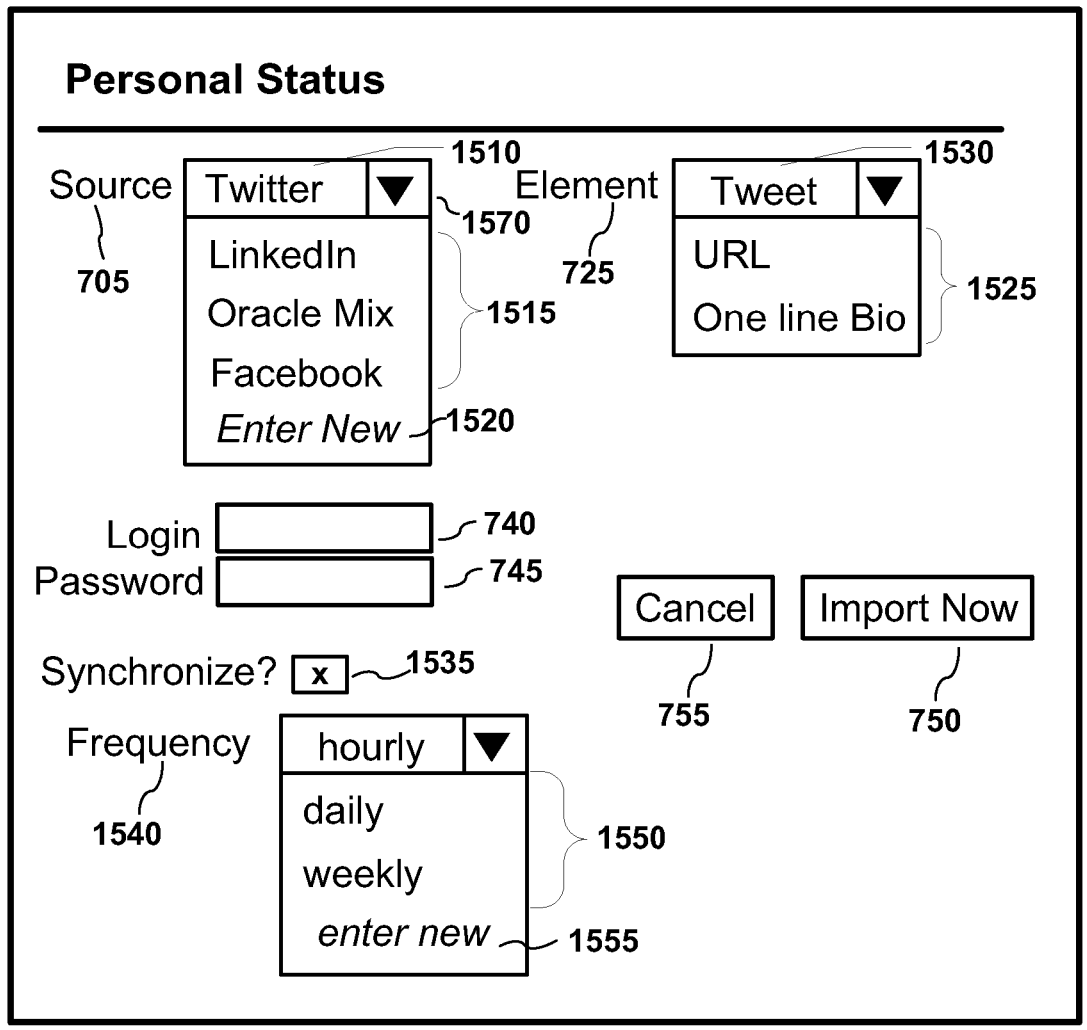
FIG. 15 depicts an interface that allows a user to define mappings of elements between a first source of data and a second source of data and to synchronize the data between the sources according to various embodiments of the invention.

In embodiments, the managing of data elements between sources of data may be configured to occur according to a schedule. FIG. 15 depicts an interface that allows a user to define mappings of elements between a first source of data and a second source of data and to synchronize the data between the sources according to various embodiments of the invention.

The user interface 1500 depicted in FIG. 15 is similar in structure and content to that depicted in FIG. 7. The interface 1500 displays a title of the referring section, in this case "Personal Status," and the interface 1500 provides a section 705 in which the user can select a second source of data. In the embodiment depicted in FIG. 15, a dropdown box 1525 is displayed within the interface 1500. Selecting the dropdown box 1570 displays to the user a listing of sources of data 1515. The user can select a source of data 1510, in this case Twitter 1510, from the listing 1515. As with the embodiment depicted in FIG. 7, if a source of data is not in the listing 1515, a user may add or suggest a new source of data 1520. As discussed previously, the addition of new services may be restricted to an administrator. Also depicted in the embodiment shown in FIG. 15, the user interface displays the elements 1525 available from the selected source of data 1510. In the illustrated example, the element, "Personal Status" of the first source of data is mapped to the element "Tweet" 1530 of the second source of data, Twitter 1510. Thus, the data associated with the element Tweet 1530 at the Twitter site will be imported into the Personal Status section 1020 (FIG. 10).

Having identified the source of data and the element or elements to be imported, a user can indicate that she wants to synchronize the data at some interval by selecting the "Synchronize" 1535 indicator, which may be implemented, by way of example and not limitation, as a radio button. In embodiments, by selecting synchronization, the user interface may update to provide frequency options 1540, or alternatively, the frequency interface 1540 may always be present in the interface 1500. It shall be noted that how the synchronization and frequency options are presented to a user are not critical to the present invention. In embodiments, the frequency options interface 1540 is a dropdown menu with pre-populated options, such as hourly, daily, and weekly. In the depicted embodiment, a user may also enter a user-specific schedule 1555. Once selected, the importing from the specified mapping will occur at the designated schedule.

F. Embodiments for Managing Data for a Separate Editable Page with Multiple Fields FIG. 16 depicts a user interface 1600 for displaying profile data associated with a user according to various embodiments of the invention. As shown in FIG. 16, a user's profile data is presented in like manner as depicted with respect the interface illustrated in FIG. 14; however, the "Experience and Qualifications" section 1605 of the profile is displayed in more detail. Selection of the "Experience and Qualifications" section 1605 displays a page with a number of data fields or elements. The elements may be arranged by sections (e.g., 1610 and 1640) with subsection (e.g., 1620). For example, under the section heading "Skills and Qualifications" 1610 exists several subsections, such as "Competencies," "Accomplishments," "Awards and Honors," "Affiliations," "Schools" 1620, and so forth. In embodiments, an edit button is associated with the page or portions thereof. In the depicted embodiment, the sections "Area of Expertise" 1640 and "Skills and Qualifications" 1610 each have edit buttons (1645 and 1630, respectively) associated with each of the sections and are displayed near the section headings.

Selecting an edit feature causes the display of an edit interface that facilitates the selection and editing of an element or elements within the section. For example, if the user desires to amend the data associated with the "Schools" 1620 element, the user would select the edit button 1630 for that section. FIG. 17 displays an embodiment of a user interface for editing a page that contains multiple elements according to embodiments of the present invention.

Depicted in FIG. 17 is a user interface 1700 that lists the elements 1705 within the referring page section 1610 that can be edited. In the depicted example, the element "Schools" 1710 is highlighted indicating that the user, Leslie, has selected that element to edit. It should be noted that each element, or type, may contain one or more items and an item may comprise one or more data fields. In embodiments, a number may be presented by the element to indicate how many items are currently within that element. For example, the user depicted has 4 competency records, 3 accomplishment records, and 1 school record. In embodiments, if an element is not listed, a list of values 1715 is provided to the user to enter a new element (type of content). Selecting "Schools" 1710 causes the display to list the items 1720 of that element. The categories of the data fields of this element include, by way of example, Degree 1730, Area of Study 1735, School 1740, and Date Acquired 1745. The data associated with these data fields includes Leslie's Bachelor's Degree from Illinois State University, but she wants to include her post-graduate degrees. Leslie can create new records and enter the data by selecting the "Create" 1750 button. Alternatively, Leslie can opt to import the data from another source of data by selecting the import button 1725.

Figure 18:
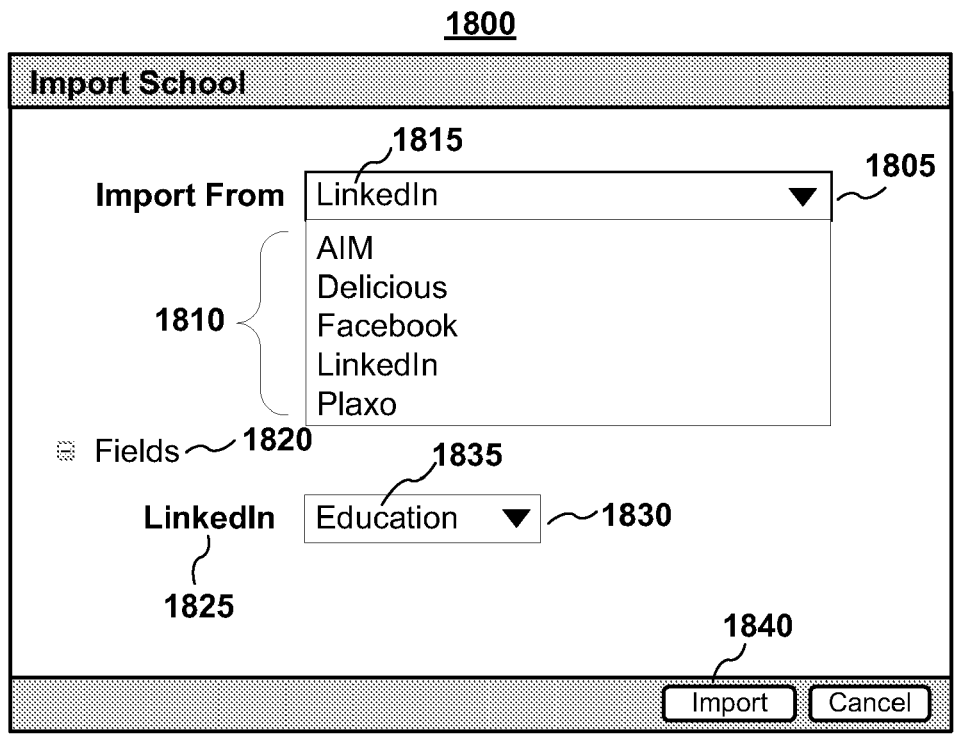
FIG. 18 depicts a user interface for mapping elements between services according to various embodiments of the invention.

In embodiments, when Leslie selects the Import button 1725, an "Import" dialog box opens. FIG. 18 depicts an import user interface 1800 according to embodiments of the invention. The user interface 1800 comprises a dropdown box 1805 that contains a listing of other sources of data 1810. In the illustration, Leslie wants to update her School information from LinkedIn 1815. The interface 1800 also includes a listing 1830, such as a dropdown listing, of the fields 1820 for the selected source of data 1825/1815. Alternatively, the selected field 1835 is already selected related to the selected category. For example, LinkedIn's Education element is automatically selected as the mapping for Schools. This automatic mapping may be pre-defined by the protocol or may be pre-defined by an administrator (embodiments of which are described below). In yet another alternative embodiment, the element mapping may have a default selection, but the user may opt to select a different field from a listing 1830. In this example, Leslie agrees with the selected mapping of elements and clicks the "Import" button 1840.

Figure 19:
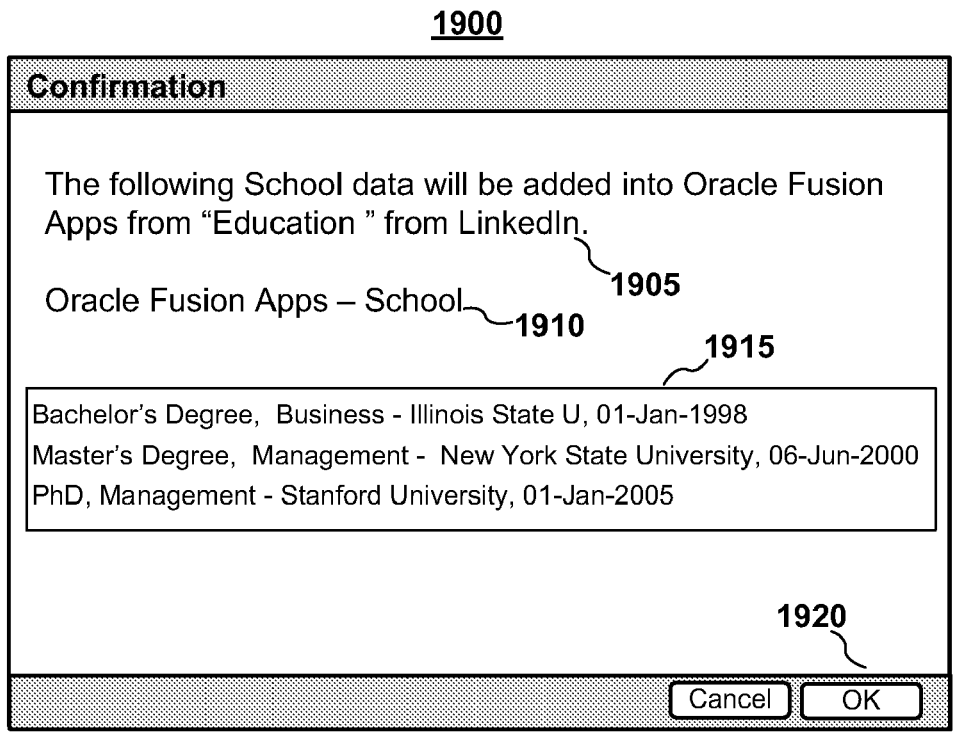
FIG. 19 depicts an example confirmation user interface according to various embodiments of the invention.

The application connects to the selected source of data to retrieve the data from the mapped fields. In embodiments, a "Confirmation" dialog box is displayed to the user to display the data that will be imported. FIG. 19 depicts an example "Confirmation" user interface 1900 according to embodiments of the present invention. In embodiment, the Confirmation interface 1900 indicates source application and element (e.g., LinkedIn and Education, respectively) 1905 and the destination application and element (Oracle Fusion Apps and School, respectively) 1910. The imported data 1915 is displayed for the user to preview. As discussed with respect to the method depicted in FIG. 3, Leslie may accept the data, edit the data, or cancel and retry the importing process with a different source of data, a different field, or both, or can cancel and manually enter 1750 the data. In embodiments, the user can select whether the imported data will replace, pre-pend, or post-pend any existing data in the destination source of data. In the illustrated embodiment, Leslie accepts 1920 the data and the data in the School section in the Oracle application is replaced by the imported data.

Figure 21:
FIG. 21 depicts the user interface of FIG. 17 that has been updated with the imported data after a user has reviewed and modified the imported data according to various embodiments of the invention.

In embodiments, the mapping definitions may include parsing information. For example, the parsing may be XML tag, tab delimited, comma delimited, space delimited, word delimited, or the like. Consider, by way of example and not limitation, the screen display 2000 depicted in FIG. 20. FIG. 20 displays the user interface of FIG. 17 that has been updated with the imported data. In the depicted embodiment, the imported data 2010 was imported using comma separations, which resulted in some of the data being entered into the incorrect columns in the designation fields (1730-1745). For example, the Area of Study information and School information were imported into the same field 1735 because the data was not separated by commas. Leslie can edit the data directly in displayed interface 2000 by cutting and pasting the date information from the School column 1740 into the Date Acquired column 1745 and by cutting and pasting the school information from the Area of Study column 1735 into the School column 1740. Alternatively, the mapping between these sources and elements may include specialized parsing definitions to address this issue. In either event, the data is ultimately in the control of the user, and can be placed into the proper column as displayed in FIG. 21. Leslie can accept this data by submitting it 2115, save it as a draft 2110, or cancel 2120. In embodiments, once the data is approved, the Update History section 2125 is updated to reflect what elements were changed and when the change occurred. Additional information, such as the mapping used and parsing rules, may also be stored.

G. Embodiments for Defining Mappings

Figure 22:
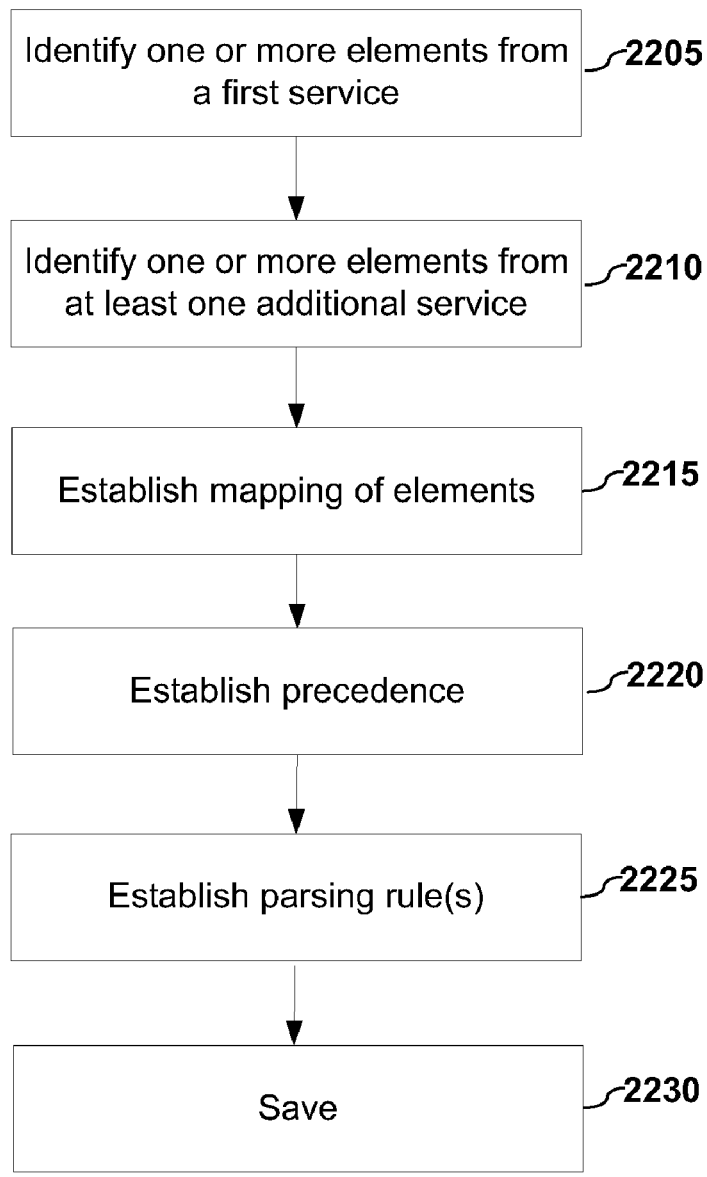
FIG. 22 depicts a method for defining mappings between two or more sources of data according to various embodiments of the invention.

FIG. 22 depicts a method 2220 for defining mappings between two or more sources of data according to various embodiments of the invention. As illustrated in FIG. 22, a user identifies (2205) one or more elements from a first service. In embodiments, the selection of the first service may be set as a default. For example, in embodiments, an application, or service, may contain user profiles and also facilitate the management of the users' profile data. Since this application contains user profiles, those elements may be selected as the default listing of elements. Alternatively, this service may be used as an intermediary to define mappings between two or more other services, in which case, the user can identify the services. In embodiments, defining mappings may be performed by an administrator of the application.

Figure 23:
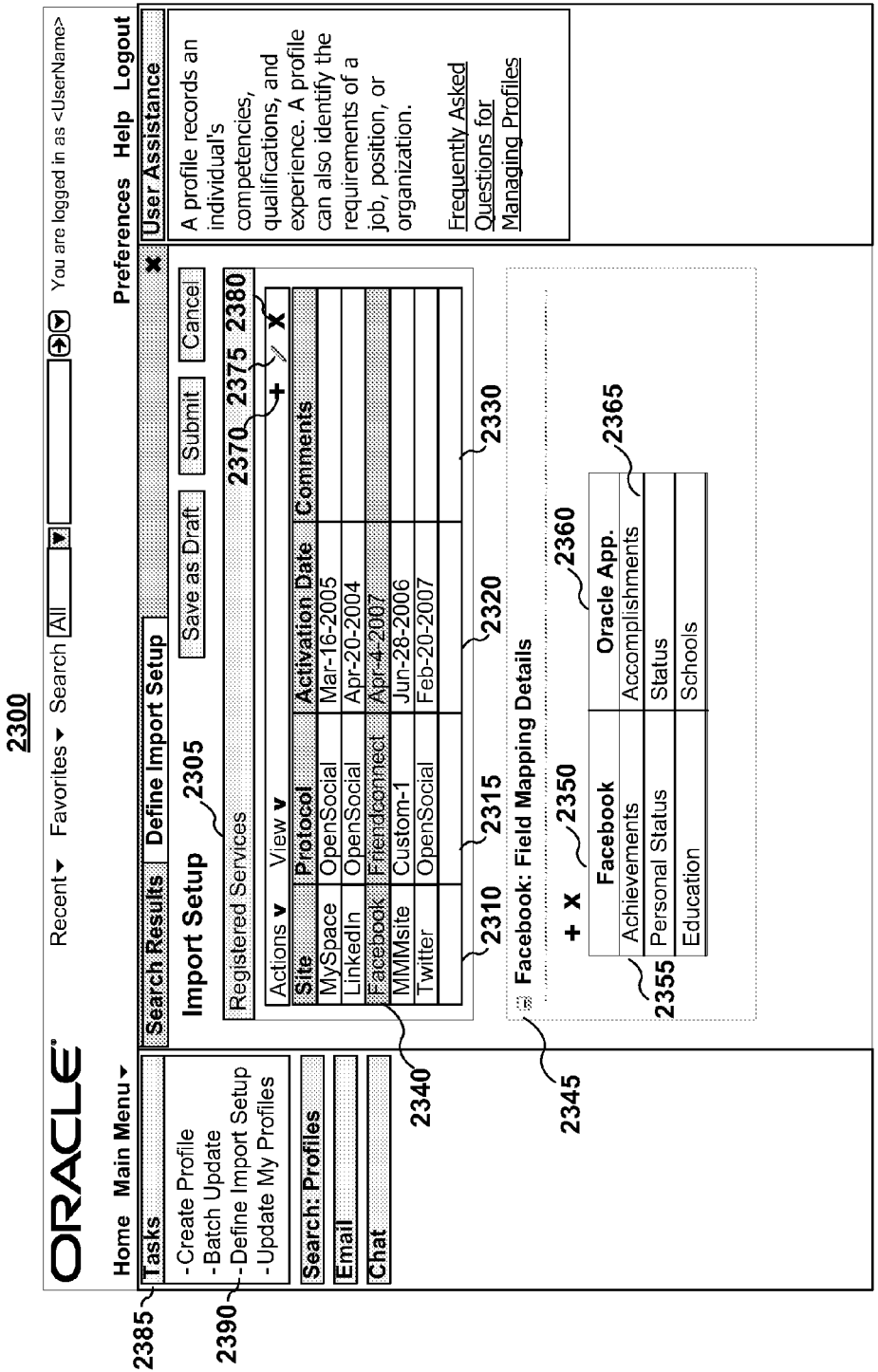
FIG. 23 illustrates an embodiment of an interface for defining sources and mappings according to various embodiments of the invention.

Consider, by way of illustration and not limitation, the user interface depicted in FIG. 23. Shown in FIG. 23 is a system administrator's interface 2300 that provides links to tools for the administrator. Among the tools displayed in the interface in FIG. 2300 is a listing of Tasks 2385 related to profiles and profile management. One tool, "Define Import Setup" 2390, facilitates the mapping between elements from different sources.

In embodiments, selecting "Define Import Setup" 2310, displays an interface that allows an administrator to view, edit, and create mappings, as well as to register new supported sources by linking to the appropriate import programs. FIG. 23 also illustrates an embodiment of an interface 2300 to facilitate mappings according to embodiments of the invention. The interface 2300 lists the current registered services 2305 that have at least one mapping definition. The list of Registered Services 2305 may contain a listing of the site 2310, the protocol used with that site 2315, an activation date 2320, and a comments section 2330. Selecting or highlighting one of the registered sites (e.g., Facebook 2340) causes the field mapping details 2345 to be displayed. In embodiments, the Field Mapping Details display 2345 lists of the service (e.g., Facebook 2350 and the Oracle application 2360) and the mappings between the services. For example, Achievements 2355 in Facebook is mapped to Accomplishments 2365 in the Oracle application.

In embodiments, the administrator may add a service to the list of registered service by selecting the "add" button 2370. Alternatively, the administrator may edit a registered service by selecting the "edit" button 2375. Consider, for purposes of illustration and not limitation, that the administrator is adding a new service.

FIG. 24 illustrates an embodiment of a user interface 2400 to define mappings between services according to embodiments of the invention. The interface 2400 comprises an identification of the service 2405, which is Plaxo in this example, the protocol used by the service 2410 (OpenSocial) to exchange information, and a date 2415. In embodiments, a protocol defines application programming interfaces (APIs) for retrieving information from and/or posting to a source of data.

Figure 25:
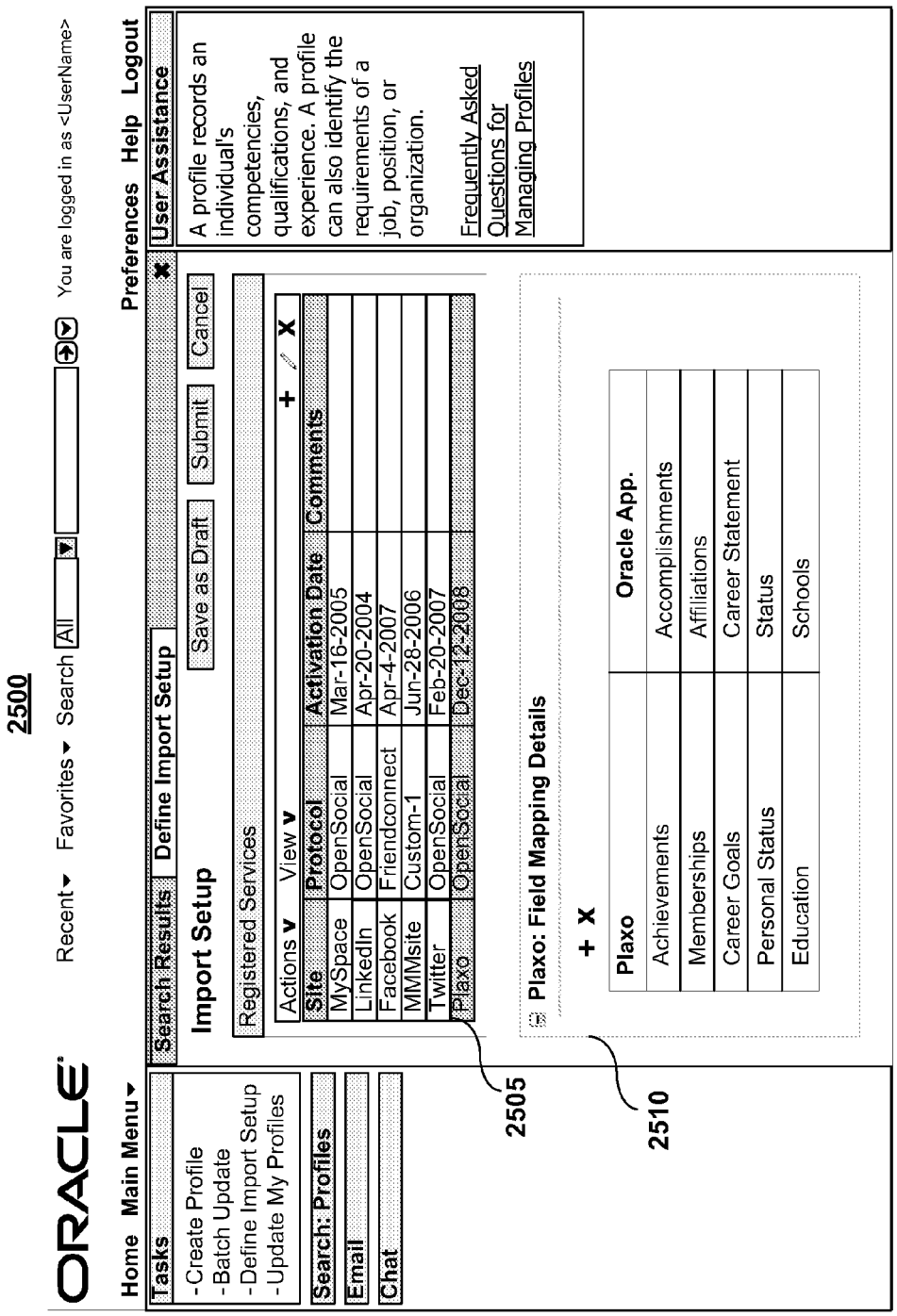
FIG. 25 depicts the interface of FIG. 23 that has been updated with the new registered service and its field mapping details according to various embodiments of the invention.

Also present in the interface 2400 is a section 2425 for defining the mappings for the elements. In this section, the administrator identifies (2205) one or more elements for a first source 2430 and identifies (2210) one or more corresponding elements from a second source 2440. In embodiments, elements that are available from a service are displayed to the administrator, and the administrator can select element mappings. For example, the administrator may select "Education" 2445 from a dropdown listing of the available elements in Plaxo and may select "Schools" 2450 from a dropdown listing of the elements available from the Oracle service. If the administrator is satisfied with these mappings, he may select "OK" to save them. Thus, mappings between elements are defined (2215), and these mappings can serve as default mappings when users want to transfer their data between these services. FIG. 25 depicts the interface of FIG. 23 that has been updated with the new registered service, Plaxo 2505, and its field mapping details 2510.

Aspects of the present invention include setting (2220) precedence values between elements. As part of the mapping, or alternatively in addition to the mapping, a user and/or an administrator can indicate, for an element, a precedence as it relates to the sources of data. For example, the user may identify the flow of data for an element or elements—whether the first source of data should overwrite the second source of data, whether the second source of data should overwrite the first source of data, or whether neither source of data has a higher precedence than the other. In embodiments, precedence may be set per element, per group of elements, per source of data, or a combination thereof.

For example, in embodiments, all data imported into the profile management application may be set by default to be overwritten. Alternatively, the precedence values may be individually set. Consider, by way of illustration and not limitation, the interface shown in FIG. 26. FIG. 26 depicts an interface similar to the shown in FIG. 24, however, it includes fields 2605 and 2610 for explicitly setting the precedence. In the depicted embodiment, the precedence is set element by element. For example, Accomplishments in Oracle is set as the source of truth 2615 and therefore has a higher precedence than Achievements in Plaxo. Whereas, Memberships in Plaxo is set as the source of truth 2620 and therefore has a higher precedence than Affiliations in the Oracle application. In embodiments, the precedence can be set at the user level, rather than (or in addition to) at the administrator level. In embodiments, where neither element has a higher precedence, the data may be concatenated and displayed for a user to edit.

One skilled in the art shall recognize that transitive properties may be used to generate additional mappings between services. For example, if mappings are set between service A and service B and set between service B and service C, then some mappings may be able to be automatically generated between service A and service C. Furthermore, in embodiments, precedence settings may be relative and universal precedence values. For example, an element in service X may always be the source of truth no matter what other service is being mapped to it; thus, the administrator or user can set that as a universal precedence.

In embodiments, as part of setting mappings, an administrator and/or a user may define (2225) parsing rules. Although preset or predefined protocols help facilitate the exchange of information between services, differences in formatting or other implementation specifics may result in differences that require special parsing rules. In embodiments, these parsing rules may be saved as part of the mappings, or as part of the interface definition API.

H. Embodiments of Exporting and Importing Data

Having an application that can manage data between a plurality of services, as described herein, is extremely beneficial. However, if a user's access to that application may one day be limited, user adoption of the application's profile management functionality may be reduced. Consider, for example, if the application is part of a company's human resources application. Users generally want assurance that they can utilize that data even if they leave the company. Thus, by having the ability to import and/or export all or portions of a user's data, the user is more likely to use the application.

1. Exporting Data

Figure 27:
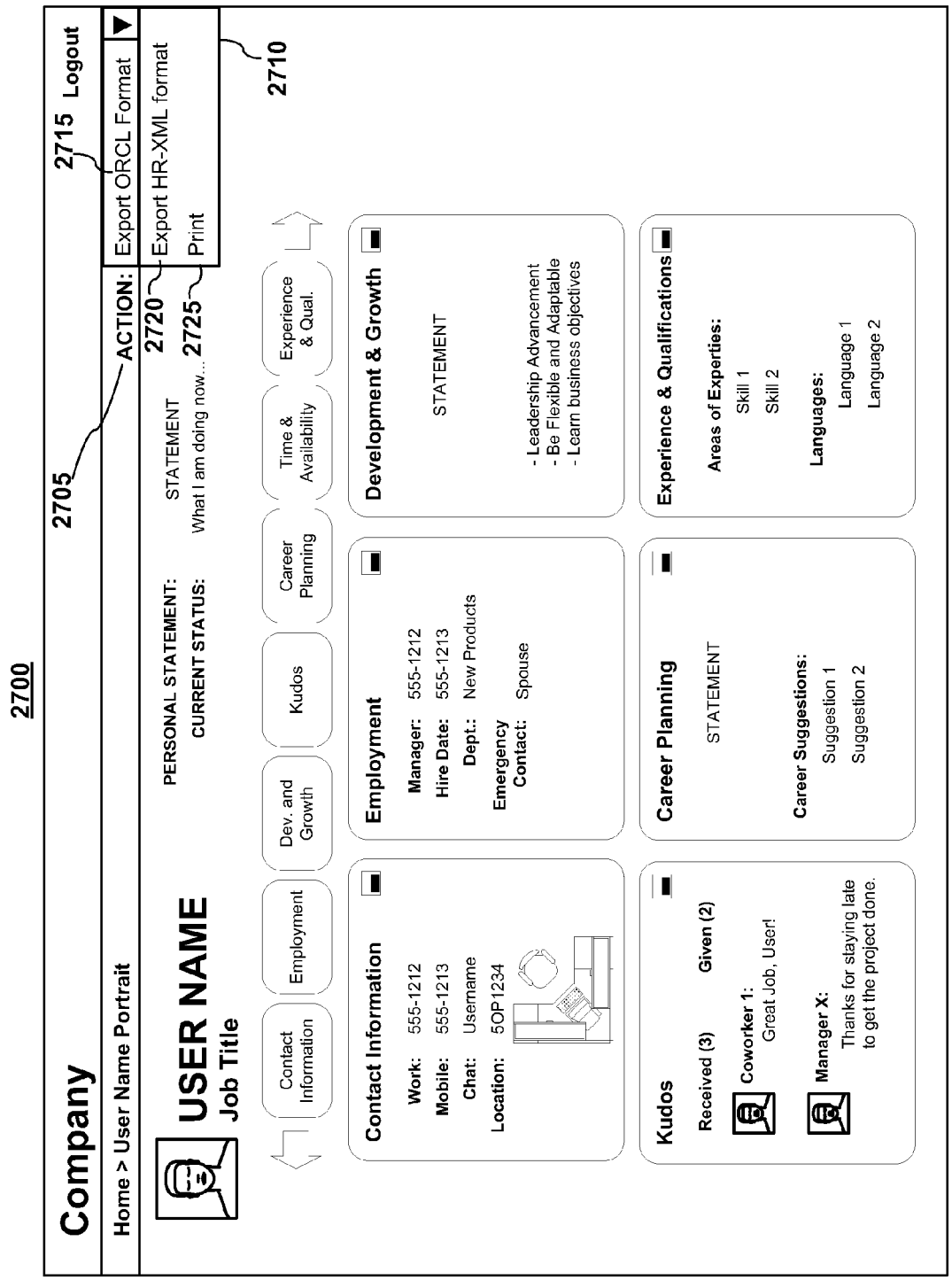
FIG. 27 depicts an embodiment of a user interface that facilitates the export of user-accessible data according to various embodiments of the invention.

FIG. 27 depicts an embodiment of a user interface that facilitates the export of some or all of the user-accessible data according to embodiments of the invention. As shown in FIG. 27, a user's portrait or profile data is presented as part of a Company's internal services. The portrait 2700 displays information associated with that user, including but not limited to, the user's name, job title, personal statement, current status, contact information, employment information, development and growth information, and so forth. Also displayed on the interface 2700 is an "Action" link 2705 that provides access to exporting functions. By selecting the "Action" button 2705, one or more export options 2710 are presented to the user. In the depicted embodiment, the user may select from one of three options, Export in an Oracle Format 2715, Export in HR-XML format 2720, or print 2725 the data. In embodiments, the user can export the data to a local memory device or to a remote memory device. In embodiments, the user has the option to secure the exported file.

2. Importing Data

Figure 28:
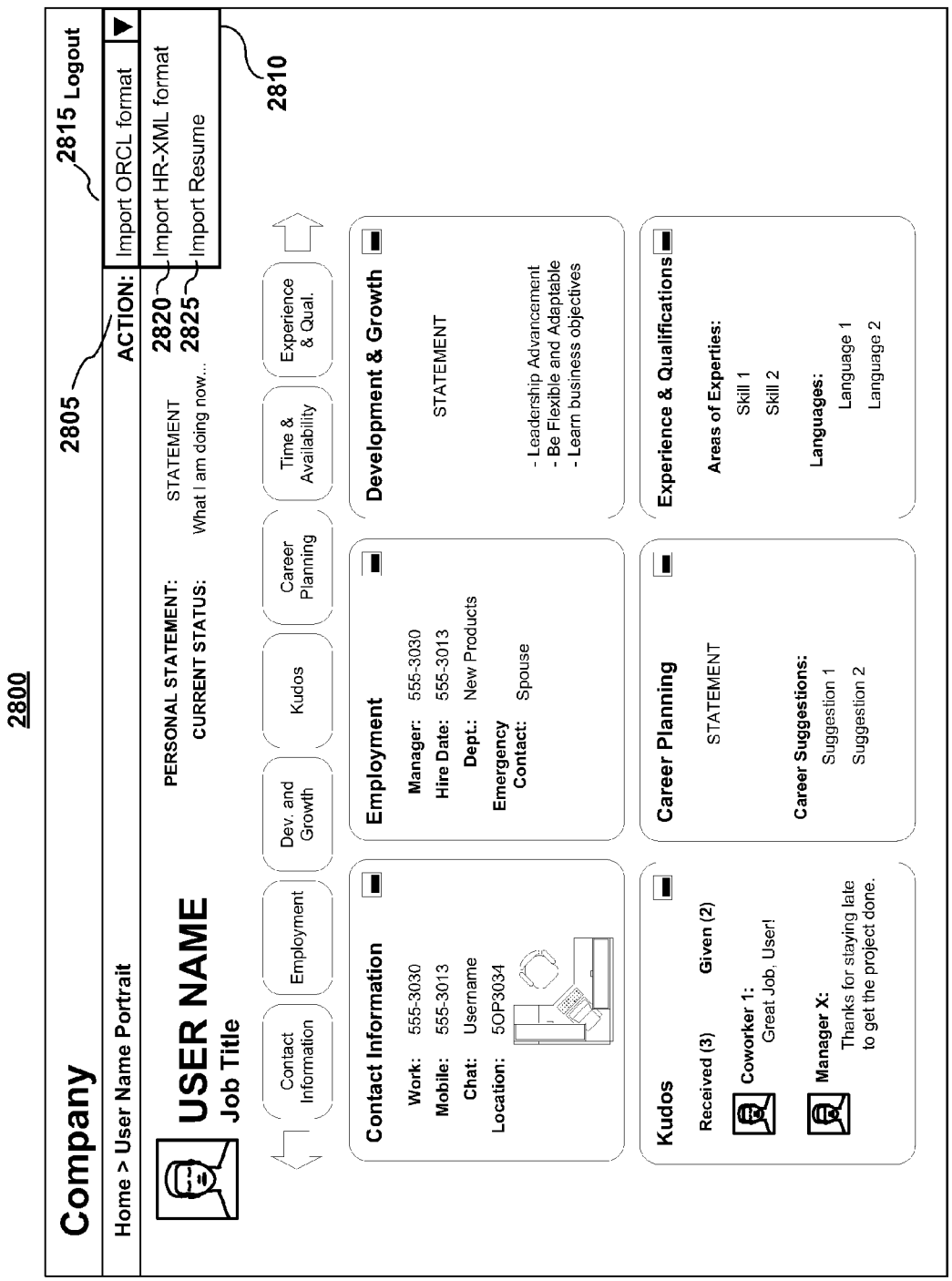
FIG. 28 depicts an embodiment of a user interface that facilitates the importing of data according to various embodiments of the invention.
Figure 29:
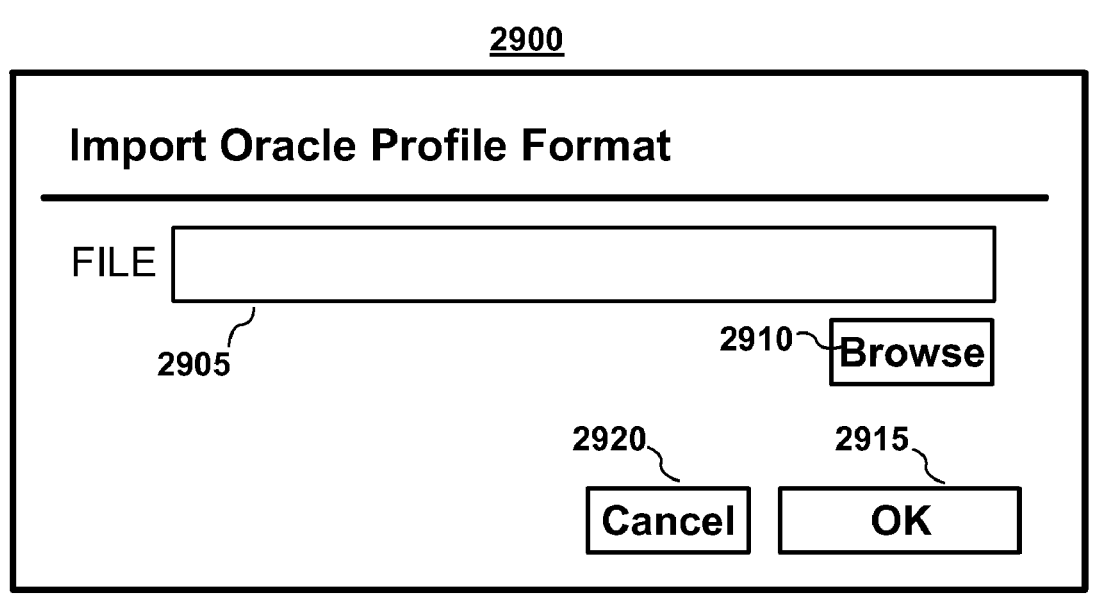
FIG. 29 depicts an example of an interface for locating a file to import a user's data according to various embodiments of the invention.

FIG. 28 depicts yet another embodiment of an interface for displaying profile data associated with a user and for providing an interface for a user to manage the user's data according to various embodiments of the invention. Similar to the interface depicted in FIG. 27, the interface depicted in FIG. 28 shows a user's profile data as part of a Company's internal services and includes an "Action" 2805 link that provides access to importing functions. By selecting the link, one or more importing options 2810 are presented to the user. In the depicted embodiment, the user may select from one of three options, Import in an Oracle format 2815, Import in HR-XML format 2820, or Import Resume 2825. To facilitate the importing, a file browse dialog box can be presented to the user. FIG. 29 depicts an example of an interface 2900 for locating a file to import a user's data according to various embodiments of the invention. The user can select "Browse" button 2910 and locate the desired user data file. In embodiment, the user can import the data from a local memory device or from a remote memory device.

Consider, by way of example, a user at Company A that has an application of the kind described herein. If the user leaves Company A, the user can export all or a portion of the user-accessible data in the application when she leaves the company. And, if the user's new company uses the same or similar system, the user can import that data into the new system using the import features described herein.

I. Computing System Implementations

In embodiments, systems that implement at least one or more of the methods described herein comprise a profile management application operating on a computer system that can interface with one or more service providers to facilitate data management. The computer system may comprise one or more computers and one or more databases. In embodiments, the profile management application may be part of an enterprise application that performs additional functions, such as, by way of example and not limitation, human resource functions. In embodiments, the service providers may be networked via a common network, such as the Internet.

It shall be noted that the present invention may be implemented in any instruction-execution/computing device or system capable of processing data, including without limitation, a general-purpose computer. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 30:
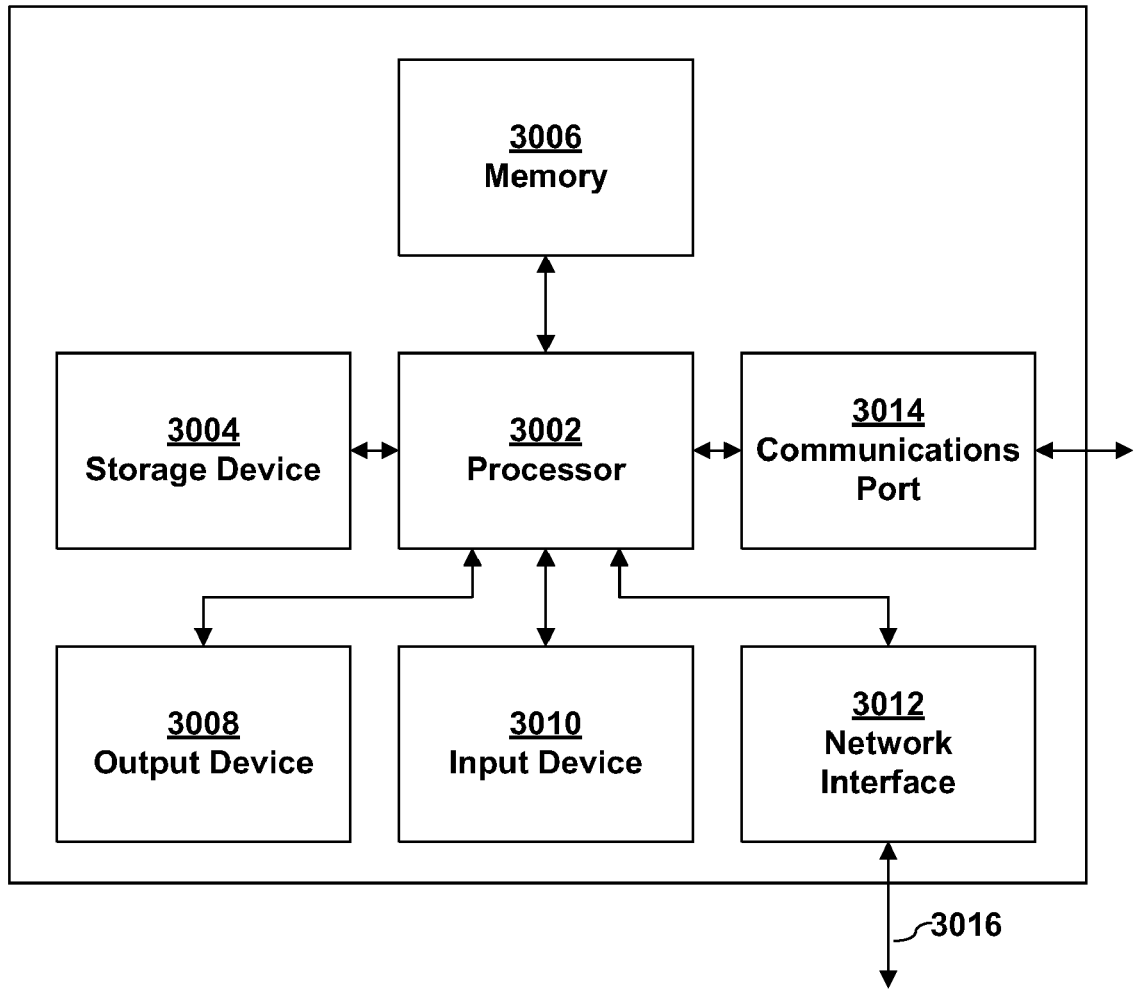
FIG. 30 depicts a block diagram of an example of a computing system according to embodiments of the present invention.

FIG. 30 depicts a functional block diagram of an embodiment of an instruction-execution/computing system 3000 that may implement or embody embodiments of the present invention. As illustrated in FIG. 30, a processor 3002 executes software instructions and interacts with other system components. In an embodiment, processor 3002 may be a general purpose processor such as (by way of example and not limitation) an AMD processor, an INTEL processor, a SUN MICROSYSTEMS processor, or a POWERPC compatible-CPU, or the processor may be an application specific processor or processors. In embodiments, storage device 3040 may comprise one or more databases. A storage device 3004, coupled to processor 3002, provides long-term storage of data and software programs. Storage device 3004 may be a hard disk drive and/or another device capable of storing data, such as a magnetic or optical media (e.g., diskettes, tapes, compact disk, DVD, and the like) drive or a solid-state memory device. Storage device 3004 may hold programs, instructions, and/or data for use with processor 3002. In an embodiment, programs or instructions stored on or loaded from storage device 3004 may be loaded into memory 3006 and executed by processor 3002. In an embodiment, storage device 3004 holds programs or instructions for implementing an operating system on processor 3002. In one embodiment, possible operating systems include, but are not limited to, UNIX, AIX, LINUX, Microsoft Windows, and the Apple MAC OS. In embodiments, the operating system executes on, and controls the operation of, the computing system 3000.

An addressable memory 3006, coupled to processor 3002, may be used to store data and software instructions to be executed by processor 3002. Memory 3006 may be, for example, firmware, read only memory (ROM), flash memory, non-volatile random access memory (NVRAM), random access memory (RAM), or any combination thereof. In one embodiment, memory 3006 stores a number of software objects, otherwise known as services, utilities, components, or modules. One skilled in the art will also recognize that storage 3004 and memory 3006 may be the same items and function in both capacities. In an embodiment, the enterprise application, the profile management service, or both may be stored in memory 3004, 3006 and executed by processor 3002.

In an embodiment, computing system 3000 provides the ability to communicate with other devices, other networks, or both. Computing system 3000 may include one or more network interfaces or adapters 3012, 3014 to communicatively couple computing system 3000 to other networks and devices. For example, computing system 3000 may include a network interface 3012, a communications port 3014, or both, each of which are communicatively coupled to processor 3002, and which may be used to couple computing system 3000 to other computer systems, networks, databases, and/or devices.

In an embodiment, computing system 3000 may include one or more output devices 3008, coupled to processor 3002, to facilitate displaying graphics and text. Output devices 3008 may include, but are not limited to, a display, LCD screen, CRT monitor, printer, touch screen, or other device for displaying information. Computing system 3000 may also include a graphics adapter (not shown) to assist in displaying information or images on output device 3008.

One or more input devices 3010, coupled to processor 3002, may be used to facilitate user input. Input device 3010 may include, but are not limited to, a pointing device, such as a mouse, trackball, or touchpad, and may also include a keyboard or keypad to input data or instructions into computing system 3000.

In an embodiment, computing system 3000 may receive input, whether through communications port 3014, network interface 3012, stored data in memory 3004/3006, or through an input device 3010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A computer-implemented method for transferring data between services, the method comprising:
    displaying to a user a first set of fields available from a first service that operates on a first computer system;
    receiving from the user a service identification, the service identification being associated with a second service that operates on a second computer system configured to store data related to the user;
    responsive to receiving the service identification from the user, displaying to the user a second set of fields available from the second service;
    receiving from the user a mapping, wherein the mapping operates to correspond the first set of fields with the second set of fields at per field level using a plurality of per field level mappings, wherein each per field level mapping associates a field in the first set of fields with a field in the second set of fields, and wherein each field is set with a precedence value that indicates a precedence of said field as said field relates to a source of data;
    identifying at run time a direction of data flow for each pair of fields in each said per field level mapping, by determining which field in the pair of fields has a higher precedence value, wherein a field has a higher precedent value in a pair of fields is set as source of truth for the pair of fields, wherein the direction of data flow within a pair of fields is identified to be that
        if a field in the first set of fields has a higher precedent value, then the field and its set of associated data in the first set of fields overwrites a corresponding field and its associated data in the second set of fields;
        if a field in the second set of fields has a higher precedent value, then the field and its set of associated data in the second set of fields overwrites a corresponding field and its associated data in the first set of fields; and
        if neither field in the pair of fields has a higher precedent value, then data associated with both the first set of field and the second set of field is concatenated and display for the user to edit;
    causing data to be transferred according to the identified direction of data flow for each pair of fields in each said per field level mapping, wherein at least one field of the first set of fields and the second set of fields comprises multiple subfields and the mapping also comprises a parsing that defines a segmenting or aggregating of the set of transferred data relative to the multiple subfields;
    using transitive properties to automatically generate additional mappings between the first service and a third service, if a mapping between the second service and the third service is provided in addition to the mapping between the first service and the second service; and
    allowing an element in one service to always be the source of truth no matter what other services are mapped to.

2. The computer-implemented method of claim 1 further comprising:
    displaying the transferred data in a draft mode to the user.

3. The computer-implemented method of claim 2 wherein the step of displaying the transferred data in a draft mode to the user comprises:
    displaying the transferred data in an interface to the user, the interface configured to present the transferred data for editing and configured to received the transferred data as edited by the user.

4. The computer-implemented method of claim 1 wherein the step of displaying to a user a first set of fields available from a first service that operates on a first computer system comprises:
    displaying to the user an interface comprising the first set of fields, the interface configured to receive an edit request to edit data associated with at least one field from the first set of fields.

5. The computer-implemented method of claim 4 further comprising:
    responsive to receiving an edit request to edit the first set of data associated with the at least one field, displaying a set of service identifications.

6. The computer-implemented method of claim 1 wherein the second set of fields available from the second service are obtained via a protocol utilized by the second service.

7. The computer-implemented method of claim 1 wherein the transfer request further comprises a request to transfer periodically according to a schedule.

8. A non-transitory computer readable medium in communication with the one or more processors, the computer readable medium having stored thereon a set of instructions executable by the one or more processors, set of instructions comprising:

displaying to a user a first set of fields available from a first service that operates on a first computer system;

receiving from the user a service identification, the service identification being associated with a second service that operates on a second computer system configured to store data related to the user;

responsive to receiving the service identification from the user, displaying to the user a second set of fields available from the second service;

receiving from the user a mapping, wherein the mapping operates to correspond the first set of fields with the second set of fields at per field level using a plurality of per field level mappings, wherein each per field level mapping associates a field in the first set of fields with a field in the second set of fields, and wherein each field is set with a precedence value that indicates a precedence of said field as said field relates to a source of data;

identifying at run time a direction of data flow for each pair of fields in each said per field level mapping, by determining which field in the pair of fields has a higher precedence value, wherein a field has a higher precedent value in a pair of fields is set as source of truth for the pair of fields, wherein the direction of data flow within a pair of fields is identified to be that if a field in the first set of fields has a higher precedent value, then the field and its set of associated data in the first set of fields overwrites a corresponding field and its associated data in the second set of fields, if a field in the second set of fields has a higher precedent value, then the field and its set of associated data in the second set of fields overwrites a corresponding field and its associated data in the first set of fields; and if neither field in the pair of fields has a higher precedent value, then data associated with both the first set of field and the second set of field is concatenated and display for the user to edit;

causing data to be transferred according to the identified direction of data flow for each pair of fields in each said per field level mapping, wherein at least one field of the first set of fields and the second set of fields comprises multiple subfields and the mapping also comprises a parsing that defines a segmenting or aggregating of the set of transferred data relative to the multiple subfields;

using transitive properties to automatically generate additional mappings between the first service and a third service, if a mapping between the second service and the third service is provided in addition to the mapping between the first service and the second service; and allowing an element in one service to always be the source of truth no matter what other services are mapped to.

* * * * *

UNITED STATES PATENT AND TRADEMARK OFFICE
CERTIFICATE OF CORRECTION

| | | |
|---|---|---|
| PATENT NO. | : 8,078,741 B2 | Page 1 of 1 |
| APPLICATION NO. | : 12/431594 | |
| DATED | : December 13, 2011 | |
| INVENTOR(S) | : Barnfield et al. | |

It is certified that error appears in the above-identified patent and that said Letters Patent is hereby corrected as shown below:

In column 17, line 15, delete "FIG. 2300" and insert -- figure 2300 --, therefor.

Signed and Sealed this
Thirteenth Day of March, 2012

David J. Kappos
*Director of the United States Patent and Trademark Office*